(12) United States Patent
Watanabe et al.

(10) Patent No.: US 11,787,981 B2
(45) Date of Patent: Oct. 17, 2023

(54) DOUBLE-SIDED PRESSURE-SENSITIVE ADHESIVE TAPE

(71) Applicant: DIC CORPORATION, Tokyo (JP)

(72) Inventors: Daisuke Watanabe, Kita-adachi-gun (JP); Takamine Sugiura, Kita-adachi-gun (JP); Akira Yamakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/734,180

(22) Filed: May 2, 2022

(65) Prior Publication Data

US 2022/0251426 A1 Aug. 11, 2022

Related U.S. Application Data

(62) Division of application No. 16/621,014, filed as application No. PCT/JP2018/022687 on Jun. 14, 2018, now abandoned.

(30) Foreign Application Priority Data

Jun. 26, 2017 (JP) ................................. 2017-124191
Mar. 1, 2018 (JP) ................................. 2018-036498

(51) Int. Cl.
| | |
|---|---|
| *B32B 43/00* | (2006.01) |
| *C09J 7/38* | (2018.01) |
| *C09J 11/04* | (2006.01) |

(52) U.S. Cl.
CPC ............. *C09J 7/385* (2018.01); *B32B 43/006* (2013.01); *C09J 7/383* (2018.01); *C09J 11/04* (2013.01); *C09J 2301/414* (2020.08); *C09J 2415/00* (2013.01); *C09J 2433/00* (2013.01); *C09J 2493/00* (2013.01); *Y10T 156/1168* (2015.01)

(58) Field of Classification Search
CPC .......................... B32B 43/006; Y10T 156/1142
See application file for complete search history.

(56) References Cited

U.S. PATENT DOCUMENTS

| | | | | |
|---|---|---|---|---|
| 2003/0211317 A1* | 11/2003 | Sheridan | ................ | C08G 18/61 248/205.3 |
| 2008/0271846 A1* | 11/2008 | Krawinkel | ............... | C09J 7/387 525/216 |
| 2008/0319130 A1 | 12/2008 | Chang | | |
| 2012/0301660 A1 | 11/2012 | Bartusiak | | |
| 2017/0145267 A1 | 5/2017 | Liu et al. | | |
| 2017/0158918 A1 | 6/2017 | Jozuka et al. | | |
| 2020/0190370 A1 | 6/2020 | Watanabe et al. | | |

FOREIGN PATENT DOCUMENTS

| | | |
|---|---|---|
| CN | 103582683 A | 2/2014 |
| CN | 106574149 A | 4/2017 |
| CN | 106661389 A | 5/2017 |
| EP | 1 795 567 A2 | 6/2007 |
| EP | 2 105 483 A1 | 9/2009 |
| JP | H07276589 A | 10/1995 |
| JP | 2004-162064 A | 6/2004 |
| JP | 2007-154078 A | 6/2007 |
| JP | 2014-520173 A | 8/2014 |
| JP | 2016-47904 A | 4/2016 |
| JP | 2016-132697 A | 7/2016 |
| JP | 2017-57303 A | 3/2017 |
| JP | 2017-155140 A | 9/2017 |
| NO | 2014/170132 A1 | 10/2014 |
| WO | 2016/114241 A1 | 7/2016 |
| WO | 2017/048890 A1 | 3/2017 |

OTHER PUBLICATIONS

International Search Report dated Aug. 28, 2018, issued in counterpart International Application No. PCT/JP2018/022687 (2 pages).
Machine translation of JP2016132697, Retrieved Nov. 6, 2020.
Database WPI, Week 201650 Jul. 25, 2016 (Jul. 25, 2016)Thomson Scientific, London, GB;AN 2016-44853X, cited in EESR.
Database WPI, Week 201681 Nov. 21, 2016 (Nov. 21, 2016 )Thomson Scientific, London, GB; AN 2016-724917 cited in EESR.

* cited by examiner

*Primary Examiner* — Linda L Gray
*Assistant Examiner* — Nickolas R Harm
(74) *Attorney, Agent, or Firm* — WHDA, LLP

(57) ABSTRACT

The invention relates to a method for peeling a pressure-sensitive adhesive tape including: a pressure-sensitive adhesive layer. The pressure-sensitive adhesive tape has a thickness greater than 150 µm and smaller than 1,500 µm, an elongation at break of 600% to 3,000%, and a stress at break of 2.5 to 80.0 MPa. According to the invention, the conformity and the adhesion with respect to an adherend, particularly, a hard adherend, are excellent, and excellent re-peeling properties are obtained, so that the pressure-sensitive adhesive tape can be stretched and peeled off in a horizontal direction, without necessity for embrittling the pressure-sensitive adhesive tape by heating or by using an organic solvent or the like or without remaining of the pressure-sensitive adhesive on the adherend, in a case of peeling the pressure-sensitive adhesive tape.

25 Claims, No Drawings

DOUBLE-SIDED PRESSURE-SENSITIVE ADHESIVE TAPE

CROSS-REFERENCE TO RELATED APPLICATIONS

This application is a divisional of U.S. application Ser. No. 16/621,014, filed on Dec. 10, 2019, which is a 371 of International Application No. PCT/JP2018/022687, filed on Jun. 14, 2018, which claims the benefit of priority from Japanese Patent Application No. 2018-036498, filed on Mar. 1, 2018, and Japanese Patent Application No. 2017-124191, filed on Jun. 26, 2017.

TECHNICAL FIELD

The present invention relates to a double-sided pressure-sensitive adhesive tape.

BACKGROUND ART

A pressure-sensitive adhesive tape is widely used for fixing and the like of components configuring electronic equipment. Specifically, the pressure-sensitive adhesive tape is used for fixing sheet metals configuring comparatively large-sized electronic equipment such as flat-panel televisions, household electric appliances, or OA equipment to each other, or fixing an exterior component and a housing to each other, and fixing a rigid component such as an exterior component or a battery to comparatively small-sized electronic equipment such as portable electronic terminals, cameras, or personal computers. In these rigid components, a rugged shape may be formed or distortion may be generated, and it is necessary that the pressure-sensitive adhesive tape has conformity so that it can conform to the surface shapes thereof while exhibiting strong adhesion.

In addition, in flat-panel televisions, household electric appliances, and in the OA equipment field such as printers or photocopiers, a reusable component which is used in a product is decomposed and reused after the usage in many cases for resource saving from a viewpoint of environmental harmony. At this time, in a case of using the pressure-sensitive adhesive tape, it is necessary to peel off the pressure-sensitive adhesive tape bonded to a component, and the pressure-sensitive adhesive may remain on an adherend at the time of the peeling off, the pressure-sensitive adhesive tape may be cut, or a double-sided pressure-sensitive adhesive tape may break between non-woven fabric layers.

In addition, in a case where hard materials such as metal or plastic are strongly bonded to each other using a pressure-sensitive adhesive tape of the related art, it is necessary to peel off a pressure-sensitive adhesive component by heating and softening the pressure-sensitive adhesive component. In this case, an effect due to the heating such as deterioration may occur also in metal or plastic of an adherend desired to be reused. Furthermore, it is also possible to embrittle and peel off the pressure-sensitive adhesive tape by using an organic solvent, in the same manner, but deterioration of the adherend may occur in the same manner as in the case of the heating.

Regarding this problem, a band-shaped pressure-sensitive adhesive sheet formed of three layers, in which each of the three layers is configured with a transparent pressure-sensitive adhesive including an aromatic vinyl hydride block copolymer and a pressure-sensitive adhesive applying agent resin as a base has been proposed (JP-A-2004-162064).

However, in a case where three layers of the layer including an aromatic vinyl hydride block copolymer and a pressure-sensitive adhesive applying agent as a base are laminated on each other, sufficient initial adhesion may not be obtained, and for example, the adhesion may be deteriorated, in a case where hard adherends having great distortion are bonded to each other.

In addition, a method of using a pressure-sensitive adhesive tape having strong adhesion used in general is also provided, but re-peeling properties which is a problem cannot be sufficiently ensured.

CITATION LIST

Patent Literature

PTL 1: JP-A-2004-162064

SUMMARY OF INVENTION

Technical Problem

An object of the invention is to provide a pressure-sensitive adhesive tape having excellent conformity and adhesion with respect to an adherend, particularly, a hard adherend, and having excellent re-peeling properties of being capable of being stretched and peeled off in a horizontal direction of the pressure-sensitive adhesive tape, without the necessity for embrittling the pressure-sensitive adhesive tape by heating or by using an organic solvent or the like or without remaining of the pressure-sensitive adhesive on the adherends, in a case of peeling the pressure-sensitive adhesive tape.

Solution to Problem

As a result of intensive studies, the inventors have completed the invention for achieving the object described above.

The invention provides a pressure-sensitive adhesive tape including a pressure-sensitive adhesive layer. The pressure-sensitive adhesive tape has a thickness greater than 150 μm and smaller than 1,500 μm, an elongation at break of 600% to 3,000%, and a stress at break of 2.5 to 80.0 MPa.

Advantageous Effects of Invention

The pressure-sensitive adhesive tape of the invention has excellent conformity and can be strongly bonded, even in a case where hard adherends such as metal or plastic are bonded to each other, and can be cleanly peeled off by stretching in a horizontal direction, without any necessity for embrittling the pressure-sensitive adhesive tape by heating or by using an organic solvent or the like and without residue of the pressure-sensitive adhesive on the adherends, in a case of peeling the both adherends.

DESCRIPTION OF EMBODIMENTS

Hereinafter, a configuration of the pressure-sensitive adhesive tape of the invention will be described in detail.

Pressure-Sensitive Adhesive Tape

A pressure-sensitive adhesive tape of the invention is a pressure-sensitive adhesive tape having a thickness greater than 150 μm and smaller than 1,500 μm, an elongation at break of 600% to 3,000%, and a stress at break of 2.5 to 80.0 MPa.

The thickness of the pressure-sensitive adhesive tape is preferably greater than 150 μm, more preferably equal to or greater than 170 μm, even more preferably equal to or greater than 200 μm, and particularly preferably equal to or greater than 250 μm. In addition, the thickness of the pressure-sensitive adhesive tape is preferably smaller than 1,500 μm, more preferably equal to or smaller than 1,400 μm, even more preferably equal to or smaller than 1,300 μm, and particularly preferably equal to or smaller than 1,200 μm. It is preferable that the thickness of the pressure-sensitive adhesive tape is set in the range described above, because distortion or the like of an adherend is easily followed, excellent bonding strength is easily obtained, a stress necessary in a case of stretching and re-peeling off the pressure-sensitive adhesive tape in a horizontal direction is not excessively great. A case where the pressure-sensitive adhesive tape of the invention has an adherend that is a hard material such as metal or plastic and has a large area is also assumed. In general, the larger the area of an adherend, it is more difficult to perform molding by suppressing distortion. By following distortion of such an adherend with the pressure-sensitive adhesive tape, it is possible to more accurately complete a fine mechanism such as electronic equipment, for example.

The elongation at break of the pressure-sensitive adhesive tape is preferably 600% to 3,000%, more preferably 650% to 2,800%, even more preferably 700% to 2,700%, and still preferably 750% to 2,600%. The pressure-sensitive adhesive tape of the invention is a comparatively thick pressure-sensitive adhesive tape having a thickness greater than 150 μm and smaller than 1,500 μm as described above, and has strong adhesion. In a case of stretching and peeling off the pressure-sensitive adhesive tape which is strongly bonded as described above, the peeling can be performed at a suitable tensile stress, even in a case where the pressure-sensitive adhesive tape is strongly bonded to the adherend, and the pressure-sensitive adhesive tape can be easily peeled off, without excessively stretching the pressure-sensitive adhesive tape in a peeling step, by setting the elongation at break in the range described above.

The stress at break of the pressure-sensitive adhesive tape is preferably 2.5 to 80.0 MPa, more preferably 3.0 to 60.0 MPa, even more preferably 3.5 to 30.0 MPa, and still preferably 4.0 to 20.0 MPa. By setting the stress at break of the pressure-sensitive adhesive tape in the range described above, the pressure-sensitive adhesive tape is not torn and the pressure-sensitive adhesive tape is suitably easily stretched, even in a case of stretching and peeling off the pressure-sensitive adhesive tape, and a re-peeling operation by peeling is easily performed. In addition, power necessary for stretching the pressure-sensitive adhesive tape for deformation also depends on the thickness of the pressure-sensitive adhesive tape. For example, in a case of stretching and re-peeling the pressure-sensitive adhesive tape having a great thickness and a high stress at break, the pressure-sensitive adhesive cannot be sufficiently stretched and cannot be re-peeled off.

The stress at 25% elongation of the pressure-sensitive adhesive tape is preferably 0.05 to 10.0 MPa, more preferably 0.1 to 5.0 MPa, even more preferably 0.15 to 3.0 MPa, and still preferably 0.2 to 2.0 MPa. By setting the stress at 25% elongation of the pressure-sensitive adhesive tape in the range described above, it is possible to obtain a suitable bonding strength for the pressure-sensitive adhesive tape, and comparatively easy peel off even in a re-peeling step. In a case where the stress at 25% elongation thereof is smaller than the range described above, the pressure-sensitive adhesive tape may be peeled off, in a case where a load is applied in a shear direction of the pressure-sensitive adhesive tape, while fixing hard adherends to each other. In addition, in a case where the stress at 25% elongation thereof is greater than the range described above, the power necessary for stretching the pressure-sensitive adhesive tape becomes excessive, in a peeling step of the pressure-sensitive adhesive tape.

The stress at 50% elongation of the pressure-sensitive adhesive tape is preferably 0.05 to 10.5 MPa, more preferably 0.1 to 5.5 MPa, even more preferably 0.15 to 3.5 MPa, and still preferably 0.2 to 2.5 MPa. By setting the stress at 50% elongation of the pressure-sensitive adhesive tape in the range described above, it is possible to obtain a suitable bonding strength for the pressure-sensitive adhesive tape, and comparatively easy peel off even in the re-peeling step. In a case where the stress at 50% elongation thereof is smaller than the range described above, the pressure-sensitive adhesive tape may be peeled off in a case where a load is applied in a shear direction of the pressure-sensitive adhesive tape, while fixing hard adherends to each other. In addition, in a case where the stress at 50% elongation thereof is greater than the range described above, the power necessary for stretching the pressure-sensitive adhesive tape becomes excessive in a peeling step of the pressure-sensitive adhesive tape.

The stress at 50% elongation of the pressure-sensitive adhesive tape is preferably 100% to 160%, more preferably 103% to 150%, even more preferably 105% to 140%, and still preferably 110% to 130% of the stress at 25% elongation.

By setting the stress at 50% elongation of the pressure-sensitive adhesive tape in the range described above with respect to the stress at 25% elongation of the pressure-sensitive adhesive tape, a stress necessary for the peeling in the re-peeling step during the re-peeling of the pressure-sensitive adhesive tape can be stabilized.

The storage elastic modulus E' (23° C.) at 23° C. of the pressure-sensitive adhesive tape is preferably $1.0 \times 10^4$ to $1.0 \times 10^8$ Pa, more preferably $5.0 \times 10^4$ to $5.0 \times 10^7$ Pa, even more preferably $1.0 \times 10^5$ to $1.0 \times 10^7$ Pa, still preferably $3.0 \times 10^5$ to $8.0 \times 10^6$ Pa. By setting the stress at break of the pressure-sensitive adhesive tape in the range described above, distortion or the like of an adherend is easily followed, excellent bonding strength is easily obtained, dimensional stability of the pressure-sensitive adhesive tape can also be ensured, and accordingly, suitable bonding operability is obtained. As described above, the pressure-sensitive adhesive tape of the invention is obtained by assuming a case where an adherend is a hard material such as metal or plastic and has a large area. In general, as an adherend has a large area, it is difficult to perform molding by suppressing distortion. In a case of the pressure-sensitive adhesive tape having the storage elastic modulus, such distortion of the adherend described above can be followed with the pressure-sensitive adhesive tape and suitable adhesion can be obtained.

The 180° peel strength of the pressure-sensitive adhesive tape is preferably equal to or more than 5 N/20 mm, more preferably equal to or more than 7 N/20 mm, even more preferably equal to or more than 9 N/20 mm, and still preferably equal to or more than 12 N/20 mm. In a case where the 180° peel strength of the pressure-sensitive adhesive tape is in the range described above, excellent adhesion is easily obtained, even in a case where the adherends are both rigid bodies. In the stretchable pressure-sensitive adhesive tape as in the invention, the 180° peel strength which is less than the range described above shows a low interface bonding strength to the adherend. Accordingly, in a case where the pressure-sensitive adhesive tape is used for bonding the rigid bodies to each other, sufficient adhesive behavior may not be obtained.

Pressure-Sensitive Adhesive Layer

The pressure-sensitive adhesive tape of the invention includes a pressure-sensitive adhesive layer. As the pressure-sensitive adhesive layer, a pressure-sensitive adhesive known in the related art can be used.

The thickness of the pressure-sensitive adhesive layer varies depending on the configuration of the pressure-sensitive adhesive tape of the invention. The thickness thereof is preferably greater than 150 μm, more preferably equal to or greater than 170 μm, even more preferably equal to or greater than 200 μm, and particularly preferably equal to or greater than 250 μm, under the condition of satisfying the thickness range of the pressure-sensitive adhesive tape of the invention. In addition, the thickness of the pressure-sensitive adhesive tape is preferably smaller than 1,500 μm, more preferably equal to or smaller than 1,400 μm, even more preferably equal to or smaller than 1,300 μm, and particularly preferably equal to or smaller than 1,200 μm. Furthermore, in a case where a base material is provided on the pressure-sensitive adhesive tape of the invention, the thickness of the pressure-sensitive adhesive layer is preferably ½ to 1/500, more preferably ⅓ to 1/300, even more preferably ⅕ to 1/200, and still preferably 1/10 to 1/50, with respect to a thickness of a base material layer. By setting a thickness ratio of the pressure-sensitive adhesive layer and the base material layer of the pressure-sensitive adhesive tape in the range described above, it is possible to obtain excellent adhesion and re-peeling properties of the pressure-sensitive adhesive tape. In the pressure-sensitive adhesive tape of the invention, the cohesive force of the pressure-sensitive adhesive layer is lower than the cohesive force of the base material, and accordingly, in a case where the thickness of the pressure-sensitive adhesive layer is greater than the range described above, only the pressure-sensitive adhesive layer may remain on the adherend in the re-peeling step of the pressure-sensitive adhesive tape. In addition, in a case where the thickness of the pressure-sensitive adhesive layer is smaller than the range described above, the pressure-sensitive adhesive layer cannot be followed and the bonding strength may not be significantly deteriorated, in a case where the surface of the adherend has a rugged shape or the like.

The stress at break of the pressure-sensitive adhesive layer is preferably 0.5 to 25.0 MPa, more preferably 0.8 to 20.0 MPa, even more preferably 1.0 to 17.0 MPa, and still preferably 1.2 to 15.0 MPa. It is preferable that the stress at break of the pressure-sensitive adhesive layer is in the range described above, because excellent pressure-sensitive adhesion can be obtained, and in a case where the pressure-sensitive adhesive tape of the invention is stretched in a horizontal direction and peeled off, the pressure-sensitive adhesive component hardly remains on the adherend.

Examples of the pressure-sensitive adhesive used in the pressure-sensitive adhesive layer include an acryl-based pressure-sensitive adhesive, a urethane-based pressure-sensitive adhesive, a rubber-based pressure-sensitive adhesive such as a synthesis rubber-based pressure-sensitive adhesive or a natural rubber-based pressure-sensitive adhesive, and a silicone-based pressure-sensitive adhesive.

Acryl-Based Pressure-Sensitive Adhesive

As the acryl-based pressure-sensitive adhesive, a pressure-sensitive adhesive containing an acrylic polymer and, if necessary, an additive such as a pressure-sensitive adhesive applying resin or a crosslinking agent can be used.

The acrylic polymer can be, for example, produced by polymerizing a monomer mixture containing a (meth)acrylic monomer.

As the (meth)acrylic monomer, for example, alkyl (meth) acrylate and the like including an alkyl group having 1 to 12 carbon atoms can be used, and, for example, methyl (meth) acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, and 2-ethylhexyl (meth)acrylate can be used alone or in combination of two or more kinds thereof.

As the alkyl (meth)acrylate including an alkyl group having 1 to 12 carbon atoms, alkyl (meth)acrylate including an alkyl group having 4 to 12 carbon atoms is preferably used, alkyl (meth)acrylate including an alkyl group having 4 to 8 carbon atoms is more preferably used, and n-butyl acrylate is particularly preferably used, from a viewpoint of ensuring excellent adhesion to the adherend.

The content of the alkyl (meth)acrylate including an alkyl group having 1 to 12 carbon atoms is preferably 80% to 98.5% by mass and more preferably 90% to 98.5% by mass, with respect to a total amount of the monomer used in the producing of the acrylic polymer.

As the monomer which can be used in the producing of the acrylic polymer, a high-polar vinyl monomer can be used, if necessary, other than the examples described above.

As the high-polar vinyl monomer, for example, (meth) acrylic monomers such as a (meth)acrylic monomer including a hydroxyl group, a (meth)acrylic monomer including a carboxyl group, and a (meth)acrylic monomer including an amide group can be used alone or in combination of two or more kinds thereof.

As a vinyl monomer including a hydroxyl group, for example, a (meth)acrylic monomer such as 2-hydroxyethyl (meth)acrylate, 2-hydroxypropyl (meth)acrylate, 4-hydroxybutyl (meth)acrylate, or 6-hydroxyhexyl (meth)acrylate can be used.

As a vinyl monomer including a carboxyl group, (meth) acrylic monomers such as acrylic acid, methacrylic acid, itaconic acid, maleic acid, (meth)acrylic acid dimer, crotonic acid, and ethylene oxide-modified oxalic acid acrylate can be used, and among these, acrylic acid is preferably used.

As vinyl including an amide group, (meth)acrylic monomers such as N-vinylpyrrolidone, N-vinylcaprolactam, acryloylmorpholine, acrylamide, and N,N-dimethylacrylamide can be used.

As the high-polar vinyl monomer, sulfonic acid group-containing monomers such as vinyl acetate, ethylene oxide-modified succinic acid acrylate, and 2-acrylamido-2-methylpropane sulfonic acid can be used, in addition to the examples described above.

The content of the high-polar vinyl monomer is more preferably 1.5% to 20% by mass, more preferably 1.5% to 10% by mass, and even more preferably 2% to 8% by mass, with respect to a total amount of the monomers used in the producing of the acrylic polymer, because a pressure-sensitive adhesive layer having a good balance between a cohesive force, a holding force, and adhesion can be formed.

Among the high-polymer vinyl monomers, the vinyl monomer including a hydroxyl group is preferably used, in a case of using an element containing an isocyanate-based crosslinking agent as the pressure-sensitive adhesive. Specifically, as the vinyl monomer including a hydroxyl group, 2-hydroxyethyl (meth) acrylate, 4-hydroxybutyl (meth) acrylate, or 6-hydroxyhexyl (meth) acrylate is preferably used.

The content of the vinyl monomer including a hydroxyl group is preferably 0.01% to 1.0% by mass and more preferably 0.03% to 0.3% by mass, with respect to a total amount of the monomers used in the producing of the acrylic polymer.

The acrylic polymer can be produced by polymerizing the monomer described above by a well-known polymerization method such as a solution polymerization method, a bulk polymerization method, a suspension polymerization method, or an emulsion polymerization method, and is preferably produced by a solution polymerization method or a bulk polymerization method.

In the polymerization, if necessary, a peroxide-based thermal polymerization initiator such as benzoyl peroxide or lauroyl peroxide, an azo thermal polymerization initiator such as azobisisobutylnitrile, an acetophenone-based photopolymerization initiator, a benzoin ether-based photopolymerization initiator, a benzyl ketal-based photopolymerization initiator, an acylphosphine oxide-based photopolymerization initiator, a benzoin-based photopolymerization initiator, or a benzophenone-based photopolymerization initiator can be used.

The weight average molecular weight of the acrylic polymer obtained by the method described above is preferably 300,000 to 3,000,000 and more preferably 500,000 to 2,500,000, in terms of standard styrene measured by gel permeation chromatograph (GPC).

Here, a value obtained in the measurement of the molecular weight by the GPC method is a standard polystyrene conversion value measured by a GPC device (HLC-8329GPC) manufactured by Tosoh Corporation, and the measurement conditions are as follows.

Sample concentration: 0.5% by mass (Tetrahydrofuran solution)
Sample injection amount: 100 µL
Eluent: THF
Flow rate: 1.0 mL/min
Measurement temperature: 40° C.
Main column: two TSKgel GMHHR-H (20)
Guard column: TSKgel HXL-H
Detector: differential refractometer
Standard polystyrene molecular weight: 10,000 to 20,000,000 (manufactured by Tosoh Corporation)

As the acrylic pressure-sensitive adhesive, a pressure-sensitive adhesive containing a pressure-sensitive adhesive applying resin is preferably used, in order to improve adhesion or surface bonding strength to an adherend.

As the pressure-sensitive adhesive applying resin, a rosin-based pressure-sensitive adhesive applying resin, a polymerized rosin-based pressure-sensitive adhesive applying resin, a polymerized rosin ester-based pressure-sensitive adhesive applying resin, a rosin phenol-based pressure-sensitive adhesive applying resin, a stabilized rosin ester-based pressure-sensitive adhesive applying resin, a disproportionated rosin ester-based pressure-sensitive adhesive applying resin, a hydrogenated rosin ester-based pressure-sensitive adhesive applying resin, a terpene-based pressure-sensitive adhesive applying resin, a terpene phenol-based pressure-sensitive adhesive applying resin, a petroleum resin-based pressure-sensitive adhesive applying resin, a (meth)acrylate-based pressure-sensitive adhesive applying resin, or the like can be used.

Among these, as the pressure-sensitive adhesive applying resin, the disproportionated rosin ester-based pressure-sensitive adhesive applying resin, the polymerized rosin ester-based pressure-sensitive adhesive applying resin, the rosin phenol-based pressure-sensitive adhesive applying resin, the hydrogenated rosin ester-based pressure-sensitive adhesive applying resin, the (meth)acrylate-based pressure-sensitive adhesive applying resin, and the terpene phenol-based pressure-sensitive adhesive applying resin, are preferably used alone or in combination of two or more kinds thereof.

The softening point of the pressure-sensitive adhesive applying resin is preferably 30° C. to 180° C., and more preferably 70° C. to 140° C., from a viewpoint of forming the pressure-sensitive adhesive layer having high adhesive performance. In a case of using the (meth)acrylate-based pressure-sensitive adhesive applying resin, the glass transition temperature thereof is preferably 30° C. to 200° C. and more preferably 50° C. to 160° C.

The content of the pressure-sensitive adhesive applying resin is preferably 5 parts by mass to 65 parts by mass and more preferably 8 parts by mass to 55 parts by mass with respect to 100 parts by mass of the acrylic polymer, from a viewpoint of easily ensuring adhesion to the adherend.

As the acrylic pressure-sensitive adhesive, it is preferable to use a pressure-sensitive adhesive containing a crosslinking agent, in order to further improving the cohesive force of the pressure-sensitive adhesive layer. As the crosslinking agent, an isocyanate-based crosslinking agent, an epoxy-based crosslinking agent, a metal chelate-based crosslinking agent, an aziridine-based crosslinking agent, or the like can be used. Among these, as the crosslinking agent, a crosslinking agent which is mixed after producing the acrylic polymer to allow a crosslinking reaction to proceed is preferable, and the isocyanate-based crosslinking agent and the epoxy-based crosslinking agent having high reactivity with the acrylic polymer are preferably used.

Examples of the isocyanate-based crosslinking agent include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. A trifunctional polyisocyanate-based compound is particularly preferable. Examples of the trifunctional polyisocyanate-based compound include tolylene diisocyanate and a trimethylolpropane adduct thereof, and triphenylmethane isocyanate.

As an index of a degree of crosslinking, a value of a gel fraction for measuring the amount of an insoluble matter, after the pressure-sensitive adhesive layer is immersed in toluene for 24 hours, is used. The gel fraction of the pressure-sensitive adhesive layer is preferably 10% to 70% by mass, more preferably 25% to 65% by mass, and even more preferably 35% to 60% by mass, from a viewpoint of obtaining a pressure-sensitive adhesive layer having excellent cohesiveness and adhesion.

The gel fraction indicates a value measured by the method described above. A pressure-sensitive adhesive composition is applied on a release sheet so as to have a thickness after the drying of 50 µm, the release sheet which is dried at 100° C. for 3 minutes and aged at 40° C. for 2 days is cut to have a size of 50 mm×50 mm, and this is set as a sample. Next, the mass (G1) of the sample before the toluene immersion is measured in advance, the toluene insoluble matter of the sample after the immersion in the toluene solution at 23° C. for 24 hours is separated by filtering with a 300 mesh wire net, the mass (G2) of a residue after the drying at 110° C. for 1 hour, and the gel fraction is obtained by the following equation. The weight (G3) of conductive fine particles in the sample is calculated from the mass (G1) of the sample and the composition of the pressure-sensitive adhesive.

Gel fraction(% by mass)=(G2−G3)/(G1−G3)×100

Rubber-Based Pressure-Sensitive Adhesive

As the rubber-based pressure-sensitive adhesive, a rubber material which can be normally used as a pressure-sensitive adhesive can be used, and as one particularly preferable aspect, a block copolymer of a polyaromatic vinyl compound and a conjugated diene compound can be suitably used, and particularly, a styrene-based resin such as a styrene-isoprene-styrene copolymer, a styrene-butadiene-styrene copolymer, a styrene-ethylene-butylene copolymer, or a styrene-ethylene-propylene copolymer can be used.

As the styrene-based resin used in the pressure-sensitive adhesive of the pressure-sensitive adhesive tape of the invention, a styrene-isoprene copolymer or/and a styrene-isoprene-styrene copolymer or/and a mixture of a styrene-isoprene copolymer and a styrene-isoprene-styrene copolymer can be used. The styrene-based resin configured with the component applies excellent adhesive physical properties and a holding force to the pressure-sensitive adhesive tape of the invention.

In the styrene-based resin, the content of a structural unit represented by Chemical Formula (1) is preferably 10% to 80% by mass, more preferably 12% to 60% by mass, even more preferably 15% to 40% by mass, and still preferably 17% to 35% by mass, with respect to a total mass of the styrene-isoprene copolymer and the styrene-isoprene-styrene copolymer. Therefore, it is possible to obtain excellent adhesion and heat resistance.

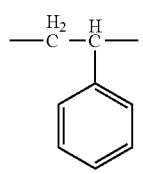

(1)

As the styrene resin, a component containing two or more kinds of copolymers having different structures is used, and a component containing a combination of a styrene-isoprene copolymer and a styrene-isoprene-styrene copolymer can be used.

In the styrene resin, the content of the styrene-isoprene copolymer is preferably 0% to 80% by mass, more preferably 0% to 77% by mass, even more preferably 0% to 75% by mass, and still preferably 0% to 70% by mass, with respect to a total mass of the styrene-isoprene copolymer and the styrene-isoprene-styrene copolymer. By setting the content thereof in the range described above, it is possible to satisfy both excellent adhesive performance and thermal durability in the pressure-sensitive adhesive tape of the invention.

In addition, in the styrene-isoprene-styrene copolymer, the weight average molecular weight measured by using the gel permeation chromatograph (GPC) in terms of standard polystyrene (gel permeation chromatography, SC-8020 manufactured by Tosoh Corporation, high-molecular-weight column TSKgel GMHHR-H, solvent: tetrahydrofuran) is preferably 10,000 to 800,000, more preferably 30,000 to 500,000, and even more preferably 50,000 to 300,000. It is more preferable that the weight average molecular weight is in the range described above, because heat fluidity or compatibility during solvent dilution can be ensured, and accordingly, the pressure-sensitive adhesive tape having thermal durability with excellent workability in a manufacturing step can be obtained.

As the styrene-based resin, for example, a resin having a single structure such as a linear structure, a branched structure, or a multi-branched structure can be used, and a resin having a mixed structure of different structures can also be used. In a case where the styrene-based resin having abundant linear structures is used in the pressure-sensitive adhesive layer, excellent adhesive performance is applied to the pressure-sensitive adhesive tape of the invention. Meanwhile, the styrene resin having a branched structure or a multi-branched structure in which a styrene block is provided on a molecular terminal can have a pseudo crosslinked structure, and excellent cohesive force can be applied, and accordingly, a high holding force can be applied. These are preferably used as a mixture in accordance with necessary properties.

A producing method of the styrene-isoprene-styrene copolymer is not particularly limited, a well-known producing method of the related art can be used, and the styrene-isoprene-styrene copolymer can be produced by the same method as that disclosed regarding the base material.

In addition, as the rubber-based pressure-sensitive adhesive, the pressure-sensitive adhesive applying resin can be used, and among these, a pressure-sensitive adhesive applying resin having a softening point equal to or higher than 80° C. is preferably used. Therefore, it is possible to obtain a pressure-sensitive adhesive and a pressure-sensitive adhesive tape having excellent initial adhesion and thermal durability. The softening point indicates a value measured by a method (dry bulb type) based on JISK 2207.

As the pressure-sensitive adhesive applying resin, for example, a pressure-sensitive adhesive applying resin which is solid at room temperature (23° C.) is preferably used, and petroleum resin such as a $C_5$ petroleum resin, a $C_5/C_9$ petroleum resin, or an alicyclic petroleum resin can be used. The petroleum resin is easily soluble with a polyisoprene structure configuring the styrene-based resin, and as a result, it is possible to further improve initial adhesive force and thermal durability of the pressure-sensitive adhesive and the pressure-sensitive adhesive tape.

As the $C_5$ petroleum resin, for example, the alicyclic petroleum resin can be used, and ESCOREZ 1202, 1304, 1401 (manufactured by Tonen Chemical Corporation), Wingtack 95 (manufactured by The Goodyear Tire & Rubber Company), Quintone K100, R100, F100 (manufactured by Zeon Corporation), and Picotac 95, Pico Pale 100 (manufactured by Rika Hercules Inc.) can be used.

As the $C_5/C_9$ petroleum resin, a copolymer of the $C_5$ petroleum resin and the $C_9$ petroleum resin can be used, and for example, ESCOREZ 2101 (Tonex Co., Ltd.), Quintone G115 (manufactured by Zeon Corporation), and Hercotack 1149 (manufactured by Rika Hercules Inc.) can be used.

The alicyclic petroleum resin is obtained by hydrogenation with respect to the $C_9$ petroleum resin described above, and, for example ESCOREZ 5300 (Tonex Co., Ltd.), ARKON P-100 (manufactured by Arakawa Chemical Industries, Ltd.), and Rigalite R101 (manufactured by Rika Hercules Inc.) can be used.

As the pressure-sensitive adhesive applying resin having a softening point equal to or higher than 80° C., for example, a polymerized rosin resin, a $C_9$ petroleum resin, a terpene resin, rosin resin, terpene-phenol resin, a styrene resin, a coumarone-indene resin, a xylene resin, and a phenol resin can be used, in addition to the $C_5$ petroleum resin, the $C_5/C_9$ petroleum resin, and the alicyclic petroleum resin.

Among these, as the pressure-sensitive adhesive applying resin having a softening point equal to or higher than 80° C., a combination of the $C_5$ petroleum resin and the polymerized rosin resin is preferably used, from a viewpoint of both satisfying more excellent initial adhesion and thermal durability.

The content of the pressure-sensitive adhesive applying resin having a softening point equal to or higher than 80° C. is preferably 3% to 100% by mass, and more preferably 5% to 80% by mass, with respect to a total amount of the styrene-based resin, and it is preferable to use 5% to 80% by mass of the pressure-sensitive adhesive applying resin having a softening point equal to or higher than 80° C., from a viewpoint of obtaining a pressure-sensitive adhesive and a pressure-sensitive adhesive tape satisfying both excellent adhesion and excellent thermal durability.

In addition, in order to obtain bonding properties in a constant temperature environment or initial adhesion, a pressure-sensitive adhesive applying resin having a softening point equal to or lower than −5° C. can also be used in combination with the pressure-sensitive adhesive applying resin having a softening point equal to or higher than 80° C. A softening point indicates a value measured by a method based on the method regulated in JISK 2269.

As the pressure-sensitive adhesive applying resin having a softening point equal to or lower than −5° C., a pressure-sensitive adhesive applying resin which is liquid at room temperature is preferably used. Such a pressure-sensitive adhesive applying resin which is liquid at room temperature is preferably selected from the well-known pressure-sensitive adhesive applying resins.

As the pressure-sensitive adhesive applying resin having a softening point equal to or lower than −5° C., for example, liquid rubber such as process oil, polyester, or polybutene can be used, and among these, polybutene is preferably used, from a viewpoint of exhibiting more excellent initial adhesion.

The content of the pressure-sensitive adhesive applying resin having a softening point equal to or lower than −5° C. is preferably 0% to 40% by mass and more preferably 0% to 30% by mass, with respect to a total amount of the pressure-sensitive adhesive applying resin.

The content of the pressure-sensitive adhesive applying resin having a softening point equal to or lower than −5° C. is preferably 0% to 40% by mass with respect to a total amount of the styrene-based resin, and in a case where the content thereof is 0% to 30% by mass, it is possible to improve initial adhesion to achieve excellent bonding, and to obtain sufficient thermal durability.

A mass ratio of the pressure-sensitive adhesive applying resin having a softening point equal to or higher than 80° C. and the pressure-sensitive adhesive applying resin having a softening point equal to or lower than −5° C. is preferably 5 to 50 and more preferably 10 to 30, from a viewpoint of obtaining a pressure-sensitive adhesive and a pressure-sensitive adhesive tape satisfying both excellent initial adhesion and excellent holding force.

A mass ratio of the styrene-based resin and the pressure-sensitive adhesive applying resin represented by [styrene-based resin/pressure-sensitive adhesive applying resin] is preferably 0.5 to 10.0, and in a case where the mass ratio thereof is 0.6 to 9.0, it is possible to improve initial adhesion and obtain excellent thermal durability. In addition, the mass ratio [styrene-based resin/pressure-sensitive adhesive applying resin] is preferably greater than 1, from a viewpoint of preventing the peeling (repulsion resistance) caused by a repulsive force of the pressure-sensitive adhesive tape, in a case where the pressure-sensitive adhesive tape is bonded to a curved surface or the like of an adherend, for example.

As the age resistor, a component which can be normally used for the pressure-sensitive adhesive can be used, and the components described in the section of the base material are used as an example.

Examples of a producing method of the pressure-sensitive adhesive layer include a cast method using an extrusion die, a uniaxial stretching method, a sequential quadratic stretching method, a simultaneously biaxial stretching method, an inflation method, a tube method, a calender method, and a solution method. Among these, the producing method by the cast method using an extrusion die or the solution method can be suitably used, and the method may be selected in accordance with the controlling of the thickness of the pressure-sensitive adhesive layer and compatibility of the laminating method of the base material.

In addition, in a case of the solution method, a method of performing direct coating on a base material with a roll coater or the like or a method using a pressure-sensitive adhesive layer which is temporarily formed on and peeled off from a release liner is used.

Examples of the release liner include paper such as Kraft paper, glassine paper, or fine paper; a resin film such as polyethylene, polypropylene (OPP, CPP), or polyethylene terephthalate; laminated paper obtained by laminating the paper and the resin film, and paper filled with clay or polyvinyl alcohol, one surface or both surfaces thereof are subjected to a peeling treatment such as a silicone-based resin.

Filler

The pressure-sensitive adhesive layer of the pressure-sensitive adhesive tape of the invention may contain a filler.

As a filler configuring the pressure-sensitive adhesive tape of the invention, one or more kinds of filler selected from the group consisting of various inorganic fillers such as metal, metal hydroxide, metal oxide, silicate, carbon, and silica, and organic beads can be used.

Examples of the metal include aluminum, magnesium, zirconium, calcium, barium, tin, nickel, titanium, copper, silver, and gold.

Examples of the metal hydroxide include aluminum hydroxide, magnesium hydroxide, zirconium hydroxide, calcium hydroxide, and barium hydroxide.

Examples of the metal oxide include silicon oxide, magnesium oxide, zinc oxide, titanium oxide, zirconium oxide, iron oxide, aluminum oxide, and calcium oxide.

Examples of the silicate include talc and mica.

The kind of the filler can be selected in accordance with the performance required for the pressure-sensitive adhesive tape, and for example, carbon is preferably used, in a case of applying coloring, concealing properties, and weather resistance.

The shape of the filler may be any of a regular shape or irregular shape, and a filler having a non-plate shape or a non-flake shape is preferably used. The non-plate shape or the non-flake shape indicates a shape having an aspect ratio of approximately 1 to 10. Among these, the shape having an aspect ratio of 1 to 10 is preferable, the shape having an aspect ratio of 1 to 9 is more preferable, and the shape having an aspect ratio of 1 to 8 is even more preferable.

In addition, as the filler, a filler having an average particle diameter of 0.01 µm to 70 µm is preferably used, and a filler having an average particle diameter of 0.02 µm to 50 µm is more preferably used. Particularly, in a case of using carbon, the average particle diameter is preferably 0.02 µm to 2 µm, more preferably 0.03 µm to 1 µm, even more preferably 0.03 µm to 0.5 µm, and still preferably 0.05 µm to 0.1 µm. In addition, in the carbon used, an aggregate in which a plurality of primary particles are aggregated is formed, and a degree of development of the aggregate (structure) is shown with an oil absorption amount. The oil absorption amount of the carbon as the filler is preferably 50 to 200 cc/100 g, more preferably 55 to 150 cc/100 g, even more preferably 60 to 120 cc/100 g, and still preferably 65 to 100 cc/100 g.

From a viewpoint of obtaining excellent re-peeling properties and pressure-sensitive adhesion, the content of the filler is preferably 1% by mass to 50% by volume, more preferably 2% to 40% by volume, more preferably 3% to 30% by volume, and even more preferably 5% to 25% by volume, with respect to a total mass of the components configuring the pressure-sensitive adhesive layer of the pressure-sensitive adhesive tape of the invention. By setting the content thereof in the range described above, it is possible to satisfy both more excellent pressure-sensitive adhesive performance and excellent re-peeling properties.

Other Additives

As an additive of the pressure-sensitive adhesive layer, an additive such as other polymer components, a crosslinking agent, an age resistor, an ultraviolet light absorber, a filler, a polymerization inhibitor, a surface modifier, an antistatic agent, an antifoaming agent, a viscosity modifier, a light stabilizer, a weather stabilizer, a heat stabilizer, an antioxidant, a leveling agent, an organic pigment, an inorganic pigment, a pigment dispersant, a plasticizer, a softener, a flame retardant, a metal deactivator, silica beads, or organic beads; or an inorganic filler such as silicon oxide, aluminum oxide, titanium oxide, zirconia, or antimony pentoxide can be used, if necessary, within a range not negatively affecting the properties.

Base Material

As one preferable aspect of the pressure-sensitive adhesive tape of the invention, in the pressure-sensitive adhesive tape, a base material is provided separately from the pressure-sensitive adhesive layer for bonding to an adherend. The pressure-sensitive adhesive layer may be provided on one surface of the base material or may be provided on both surfaces, and it is preferable that the pressure-sensitive adhesive layer is provided on both surfaces. In a case of providing the base material, the thickness thereof is preferably 100 to 1,490 µm, more preferably 120 to 1,390 µm, even more preferably 150 to 1,290 µm, and still preferably 200 µm to 1,190 µm. It is preferable that the thickness of the base material is set in the range described above, because the pressure-sensitive adhesive tape easily follows a distortion on an adherend, a high bonding strength is easily obtained, and a stress necessary for the re-peeling while stretching the pressure-sensitive adhesive tape in a horizontal direction is not excessively great.

The elongation at break of the base material of the pressure-sensitive adhesive tape is preferably 600% to 3,000%, more preferably 650% to 2,800%, even more preferably 700% to 2,700%, and still preferably 750% to 2,600%. By setting the elongation at break of the base material to be equal to or greater than the lower limit of the range described above, even in a case where the pressure-sensitive adhesive tape is strongly bonded to an adherend, the stress for stretching the tape in a horizontal direction, in a case of re-peeling the pressure-sensitive adhesive tape, is not excessively great, and the pressure-sensitive adhesive tape can be easily peeled off, without the excessive stretching, even in the peeling step. In addition, it is preferable that the elongation at break of the base material is equal to or smaller than the upper limit of the range described above, because an stretching distance in a tape horizontal direction, in a case of the re-peeling of the pressure-sensitive adhesive tape, is not excessively long, and the operation in a small space can be performed.

The stress at break of the base material is preferably 2.5 to 80.0 MPa, more preferably 3.0 to 60.0 MPa, even more preferably 3.5 to 30.0 MPa, and still preferably 4.0 to 20.0 MPa. By setting the stress at break of the base material in the range described above, the pressure-sensitive adhesive tape is prevented from being torn and such that a load for stretching the pressure-sensitive adhesive tape is not excessive, even in a case of stretching and peeling off the pressure-sensitive adhesive tape, and accordingly, a re-peeling operation by peeling is easily performed. In addition, power necessary for stretching the pressure-sensitive adhesive tape for deformation also depends on the thickness of the pressure-sensitive adhesive tape. For example, in a case of stretching and re-peeling the pressure-sensitive adhesive tape having a great thickness and a high stress at break, the pressure-sensitive adhesive cannot be sufficiently stretched and cannot be re-peeled off.

The stress at 25% elongation of the base material is preferably 0.15 to 10.0 MPa, more preferably 0.25 to 7.0 MPa, even more preferably 0.35 to 5.0 MPa, and still preferably 0.45 to 2.0 MPa. By setting the stress at 25% elongation of the pressure-sensitive adhesive tape in the range described above, it is possible to obtain a suitable bonding strength for the pressure-sensitive adhesive tape, and comparatively easy peel off even in a re-peeling step. In a case where the stress at 25% elongation thereof is smaller than the range described above, the pressure-sensitive adhesive tape may be peeled off, in a case where a load is applied in a shear direction of the pressure-sensitive adhesive tape, while fixing hard adherends to each other. In addition, in a case where the stress at 25% elongation thereof is greater than the range described above, the power necessary for stretching the pressure-sensitive adhesive tape becomes excessive in a peeling step of the pressure-sensitive adhesive tape.

The stress at 50% elongation of the base material is preferably 0.15 to 10.0 MPa, more preferably 0.25 to 7.0 MPa, even more preferably 0.35 to 5.0 MPa, and still preferably 0.50 to 2.0 MPa. By setting the stress at 50% elongation of the pressure-sensitive adhesive tape in the range described above, it is possible to obtain a suitable bonding strength for the pressure-sensitive adhesive tape, and comparatively easy peel off even in the re-peeling step. In a case where the stress at 50% elongation thereof is smaller than the range described above, the pressure-sensitive adhesive tape may be peeled off, in a case where a load is applied in a shear direction of the pressure-sensitive adhesive tape, while fixing hard adherends to each other. In addition, in a case where the stress at 50% elongation thereof is greater than the range described above, the power necessary for stretching the pressure-sensitive adhesive tape becomes excessive, in a peeling step of the pressure-sensitive adhesive tape.

The stress at 50% elongation of the base material of the pressure-sensitive adhesive tape is preferably 100% to 160%, more preferably 103% to 150%, even more preferably 105% to 140%, and still preferably 110% to 130% of the stress at 25% elongation.

By setting the stress at 50% elongation of the pressure-sensitive adhesive tape in the range described above with respect to the stress at 25% elongation of the pressure-sensitive adhesive tape, a stress necessary for the peeling in the re-peeling step during the re-peeling of the pressure-sensitive adhesive tape can be stabilized.

The storage elastic modulus E' (23° C.) at 23° C. of the base material is preferably $1.0 \times 10^4$ to $1.0 \times 10^8$ Pa, more preferably $5.0 \times 10^4$ to $5.0 \times 10^7$ Pa, even more preferably $1.0 \times 10^5$ to $1.0 \times 10^7$ Pa, still preferably $3.0 \times 10^5$ to $8.0 \times 10^6$ Pa. By setting the stress at break of the base material in the range described above, a distortion or the like of an adherend is easily followed, excellent bonding strength is easily obtained, dimensional stability of the pressure-sensitive adhesive tape can also be ensured, and accordingly, suitable bonding operability is obtained. As described above, the pressure-sensitive adhesive tape of the invention is obtained by assuming a case where an adherend is a hard material such as metal or plastic and has a large area. In general, as an adherend has a large area, it is difficult to perform molding by suppressing distortion. In a case of the pressure-sensitive adhesive tape having the storage elastic modulus, such distortion of the adherend described above can be followed with the pressure-sensitive adhesive tape and suitable adhesion can be obtained.

As the material configuring the base material of the pressure-sensitive adhesive tape of the invention, a material which can exhibit the properties described above may be used, and for example, a block copolymer of a polyaromatic vinyl compound and a conjugated diene compound can be used, and particularly, a styrene-based resin such as a styrene-isoprene-styrene copolymer, a styrene-butadiene-styrene copolymer, a styrene-ethylene-butylene copolymer, or a styrene-ethylene propylene copolymer can be used. In addition, a polyurethane resin such as ester polyurethane or ether polyurethane; a polyolefin resin such as polyethylene or polypropylene; a polyester resin such as polyethylene terephthalate, polybutylene terephthalate, or polyethylene naphthalate; polystyrene, polycarbonate, polymethylpentene, polysulfone, polyetheretherketone, polyethersulfone, polyetherimide, polyimide films, a fluorine resin, nylon, and an acrylic resin can also be used. Among these, the styrene-based resin such as the styrene-isoprene-styrene copolymer, the styrene-butadiene-styrene copolymer, the styrene-ethylene-butylene copolymer, or a styrene-ethylene-propylene copolymer; and the polyurethane resin such as ester-based polyurethane or ether-based polyurethane can be suitably used, because suitable elongation at break or stress at break is easily obtained, and particularly, the styrene-based resin such as the styrene isoprene styrene copolymer, the styrene butadiene styrene copolymer, the styrene ethylene butylene copolymer, or a styrene ethylene propylene copolymer can be suitably used.

As described above, as the base material of the pressure-sensitive adhesive tape of the invention, a styrene-based resin film in which a main component of a resin component is a styrene-based resin is preferable, and the styrene-based resin film in which the styrene-based resin occupies greater than 50% in terms of the resin composition percentage can be generally used. Since the styrene-based resin is a resin showing thermoplasticity, excellent molding properties such as extrusion molding or injection molding is obtained, and accordingly, the base material for configuring the pressure-sensitive adhesive tape of the invention is easily molded. In addition, among the resin group generally called a thermoplastic resin, the styrene-based resin easily exhibits particularly excellent elongation at break and can be suitably used as the base material of the pressure-sensitive adhesive tape of the invention.

A percentage of the styrene-based resin occupying the resin component included in the styrene-based resin film is preferably 50% to 100%, more preferably 60% to 100%, even more preferably 65% to 100%, and still preferably 70% to 100%. By setting the percentage thereof in the range described above, it is possible to obtain excellent elongation at break and stress at break of the styrene-based resin film. In addition, as resins other than the styrene-based resin included in the styrene-based resin film, various thermoplastic resin such as polyolefin or polycarbonate can be used, and one kind or a plurality of kinds can be used at the same time.

As one aspect for producing the pressure-sensitive adhesive tape of the invention, the styrene-based resin used in the base material of the pressure-sensitive adhesive tape is the styrene-isoprene copolymer or/and the styrene-isoprene-styrene copolymer or/and a mixture of the styrene-isoprene copolymer and the styrene-isoprene-styrene copolymer. By using the styrene-based resin configured with the components described above, it is possible to produce a pressure-sensitive adhesive tape having particularly preferable elongation at break and stress at break.

In the styrene-based resin, the content of a structural unit represented by Chemical Formula (2) is preferably 13% to 60% by mass, more preferably 15% to 50% by mass, even more preferably 16% to 45% by mass, and still preferably 17% to 35% by mass, with respect to a total mass of the styrene-isoprene copolymer and the styrene-isoprene-styrene copolymer. Therefore, the elongation at break or the stress at break is easily obtained in the suitable ranges.

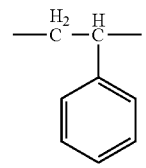

(2)

As the styrene resin, a component containing two or more kinds of copolymers having different structures is used, and a component containing a combination of a styrene-isoprene copolymer and a styrene-isoprene-styrene copolymer can be used.

In the styrene resin, the content of the styrene-isoprene copolymer is preferably 0% to 80% by mass, more preferably 0% to 70% by mass, even more preferably 0% to 50% by mass, and still preferably 0% to 30% by mass, with respect to a total mass of the styrene-isoprene copolymer and the styrene-isoprene-styrene copolymer. By setting the content thereof in the range described above, it is possible to satisfy both excellent elongation at break or stress at break, and thermal durability.

In addition, in the styrene-isoprene-styrene copolymer, the weight average molecular weight measured by using the gel permeation chromatograph (GPC) in terms of standard polystyrene (gel permeation chromatography, SC-8020 manufactured by Tosoh Corporation, high-molecular-weight column TSKgel GMHHR-H, solvent: tetrahydrofuran) is preferably 10,000 to 800,000, more preferably 30,000 to 500,000, and even more preferably 50,000 to 300,000. It is more preferable that the weight average molecular weight is in the range described above, because heat fluidity or compatibility during solvent dilution can be ensured, and accordingly, the pressure-sensitive adhesive tape having thermal durability with excellent workability in a manufacturing step can be obtained.

As the styrene-based resin, for example, a resin having a single structure such as a linear structure, a branched structure, or a multi-branched structure can be used, and a resin having a mixed structure of different structures can also be used. The styrene-based resin having a large number of linear structures applies excellent elongation at break to the pressure-sensitive adhesive tape of the invention. Meanwhile, the styrene resin having a branched structure or a multi-branched structure in which a styrene block is provided on a molecular terminal can have a pseudo crosslinked structure, and excellent cohesive force can be applied. Therefore, these are preferably used as a mixture in accordance with necessary properties.

A producing method of the styrene-isoprene-styrene copolymer is not particularly limited, and a well-known producing method of the related art can be used. For example, a method of sequentially polymerizing a styrene block and an isoprene block by an anionic living polymerization method, or a method of producing a block copolymer which is reacted and coupled with a coupling agent, after producing a block copolymer including a living active terminal is used.

The producing method of the styrene-isoprene copolymer is not particularly limited, and a well-known producing method of the related art can be used. For example, a method of sequentially polymerizing a styrene block and an isoprene block by an anionic living polymerization method is used.

The producing method of the mixture of the styrene-isoprene copolymer and the styrene-isoprene-styrene copolymer is not particularly limited, and a well-known producing method of the related art can be used. For example, a method mixing and using the styrene-isoprene copolymer and the styrene-isoprene-styrene copolymer produced as described above is used. In addition, the mixture can also be produced at the same time in one polymerization step. As a more specific aspect, by the anionic living polymerization method, first, a styrene monomer is polymerized using an anionic polymerization initiator, and a polystyrene block having a living active terminal is formed. Secondly, isoprene is polymerized from the living active terminal of the polystyrene block, and a styrene-isoprene diblock copolymer including a living active terminal is obtained. Thirdly, a part of the styrene-isoprene diblock copolymer including a living active terminal and a coupling agent are reacted with each other, and a coupled styrene-isoprene-styrene copolymer is formed. Fourthly, a living active terminal of a residue of the styrene-isoprene diblock copolymer including a living active terminal is deactivated with a polymerization terminator, and the styrene-isoprene diblock copolymer is formed.

In addition, for the base material, the pressure-sensitive adhesive applying resin can be used, in order to increase adhesion to the pressure-sensitive adhesive layer or increase heat resistance. Among these, the pressure-sensitive adhesive applying resin having a softening point equal to or higher than 80° C. can be suitably used, and the softening point thereof is more preferably equal to or higher than 90° C., even more preferably equal to or higher than 100° C., and still preferably equal to or higher than 110° C. The softening point indicates a value measured by a method (dry bulb type) based on JISK 2207.

As the pressure-sensitive adhesive applying resin, for example, a pressure-sensitive adhesive applying resin which is solid at room temperature (23° C.) is preferably used, and petroleum resin such as a $C_5$ petroleum resin, a $C_5/C_9$ petroleum resin, or an alicyclic petroleum resin can be used.

The petroleum resin is easily soluble with a polyisoprene structure configuring the styrene-isoprene copolymer or the styrene-isoprene-styrene copolymer, and as a result, it is possible to further improve initial adhesive force and thermal durability of the pressure-sensitive adhesive tape.

As the $C_5$ petroleum resin, for example, the alicyclic petroleum resin can be used, and ESCOREZ 1202, 1304, 1401 (manufactured by Tonen Chemical Corporation), Wingtack 95 (manufactured by The Goodyear Tire & Rubber Company), Quintone K100, R100, F100 (manufactured by Zeon Corporation), and Picotac 95, Pico Pale 100 (manufactured by Rika Hercules Inc.) can be used.

As the $C_5/C_9$ petroleum resin, a copolymer of the $C_5$ petroleum resin and the $C_9$ petroleum resin can be used, and for example, ESCOREZ 2101 (Tonex Co., Ltd.), Quintone G115 (manufactured by Zeon Corporation), and Hercotack 1149 (manufactured by Rika Hercules Inc.) can be used.

The alicyclic petroleum resin is obtained by hydrogenation with respect to the $C_9$ petroleum resin described above, and, for example ESCOREZ 5300 (Tonex Co., Ltd.), ARKON P-100 (manufactured by Arakawa Chemical Industries, Ltd.), and Rigalite R101 (manufactured by Rika Hercules Inc.) can be used.

As the pressure-sensitive adhesive applying resin, for example, a polymerized rosin resin, a $C_9$ petroleum resin, a terpene resin, rosin resin, terpene-phenol resin, a styrene resin, a coumarone-indene resin, a xylene resin, and a phenol resin can be used, in addition to the $C_5$ petroleum resin, the $C_5/C_9$ petroleum resin, and the alicyclic petroleum resin.

Among these, as the pressure-sensitive adhesive applying resin, a combination of the $C_5$ petroleum resin and the polymerized rosin resin is preferably used, from a viewpoint of both satisfying more excellent initial adhesion and thermal durability.

The content of the pressure-sensitive adhesive applying resin is preferably 0% to 100% by mass, and more preferably 0% to 70% by mass, even more preferably 0% to 50% by mass, and still preferably 0% to 30% by mass with respect to a total amount of the styrene-isoprene copolymer or the styrene-isoprene-styrene copolymer. By setting the content thereof in the range described above, both excellent elongation at break and thermal durability of the pressure-sensitive adhesive tape are easily satisfied, while increasing interface adhesion between the pressure-sensitive adhesive layer and the base material layer.

In addition, in the base material, an additive such as other polymer components, a crosslinking agent, an age resistor, an ultraviolet light absorber, a filler, a polymerization inhibitor, a surface modifier, an antistatic agent, an antifoaming agent, a viscosity modifier, a light stabilizer, a weather stabilizer, a heat stabilizer, an antioxidant, a leveling agent, an organic pigment, an inorganic pigment, a pigment dispersant, silica beads, or organic beads; or an inorganic filler such as silicon oxide, aluminum oxide, titanium oxide, zirconia, or antimony pentoxide can be used, if necessary, within a range not negatively affecting the properties.

As the age resistor, for example, a phenol-based age resistor is preferably used, because it is possible to effectively improve thermal stability of the styrene-isoprene copolymer, and as a result, it is possible to obtain a pressure-sensitive adhesive and a pressure-sensitive adhesive tape maintaining excellent initial adhesion and having more excellent thermal durability.

As the phenol-based age resistor, a phenol-based age resistor including a steric hindrance group is generally used, and a monophenol type, a bisphenol type, or a polyphenol type are representatives. As specific examples, 2,6-di-t-butyl-4-methylphenol, 2,2'-methylenebis (4-methyl-6-t-butylphenol), 2,2'-methylenebis (4-ethyl-6-t-butylphenol) 4,4'-thiobis (6-tert-butyl-3-methylphenol), 4,4'-butylidenebis-(3-methyl-6-tert-butylphenol), tetrakis-[methylene-3-(3'5'-di-t-butyl-4-hydroxyphenyl) propionate] methane, and n-octadecyl-3-(4'-hydroxy-3'5'-di-t-butyl phenyl) propionate can be used alone or in combination of two or more kinds thereof.

The content of the phenol-based age resistor is preferably 0.1 parts by mass to 5 parts by mass with respect to the 100 parts by mass of the styrene-isoprene block copolymer, and in a case where the content thereof is 0.5 parts by mass to 3 parts by mass, it is possible to effectively improve thermal stability of the styrene-isoprene copolymer, and as a result, it is possible to obtain a pressure-sensitive adhesive maintaining excellent initial adhesion and having more excellent thermal durability.

As the age resistor, a combination of the phenol-based age resistor and other phenol-based age resistor such as a phosphorus-based age resistor (referred to as a processing stabilizer), an amine-based age resistor, or an imidazole-based age resistor may be used, and particularly, in a case where a combination of the phenol-based age resistor and the phosphorus-based age resistor is used, it is possible to obtain a pressure-sensitive adhesive maintaining excellent initial adhesion and having more excellent thermal durability. In addition, the phosphorus-based age resistor may be slightly discolored (turned into yellow) over time in a high temperature environment, and accordingly, the used amount thereof is preferably suitably set by considering a balance between the initial adhesion, thermal durability, and discoloring prevention.

As the material used in the base material of the pressure-sensitive adhesive tape of the invention, polyurethane can also be suitably used. As the polyurethane, a reactant of polyol (b1-1) and polyisocyanate (b1-2) can be suitably used.

As the polyol (b1-1), for example, polyether polyol, polyester polyol, and polycarbonate polyol can be used. Among these, as the polyol (b1-1), in order to obtain mechanical properties of the base material, polyester polyol and polyether polyol can be used alone or in combination of two or more kinds thereof. In a case where the heat resistance of the pressure-sensitive adhesive tape of the invention is necessary, polyester polyol is preferably used, and in a case where water resistance or biodegradation resistance is necessary, polyether polyol is preferably used.

As the polyester polyol which can be used as the polyol (b1-1), for example, a component obtained by esterification reaction between a low-molecular-weight polyol and polycarboxylic acid, polyester obtained by a ring-opening polymerization reaction of a cyclic ester compound such as ε-caprolactone, and a copolymerization polyester thereof can be used.

As the low-molecular-weight polyol, for example, aliphatic alkyl glycol such as ethylene glycol, propylene glycol, 1,4-butanediol, 1,6-hexanediol, diethylene glycol, neopentyl glycol, or 1,3-butanediol having a molecular weight of approximately 50 to 300, or cyclohexane dimethanol can be used.

In addition, as the polycarboxylic acid which can be used in the producing of the polyester polyol, for example, aliphatic dicarboxylic acid such as succinic acid, adipic acid, sebacic acid, or dodecanedicarboxylic acid, aromatic dicarboxylic acid such as terephthalic acid, isophthalic acid, phthalic acid, or naphthalenedicarboxylic acid, and anhydride or esterified product thereof can be used.

As the polyol (b1-1), polyether polyol can be used. As the polyether polyol, for example, a component obtained by additional polymerization of alkylene oxide using one kind or two or more kinds of a compound having two or more active hydrogen atoms as an initiator can be used.

As the polyol (b1-1), polycarbonate polyol can be used. For example, a component obtained by reacting carbonate ester and/or phosgene and a low-molecular polyol which will be described later with each other can be used.

As the carbonate ester, for example, methyl carbonate, dimethyl carbonate, ethyl carbonate, diethyl carbonate, cyclocarbonate, or diphenyl carbonate can be used.

In addition, as the low-molecular polyol which can be reacted with carbonate ester or phosgene, for example, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexanedimethanol, hydroquinone, resorcin, bisphenol A, bisphenol F, and 4,4'-biphenol can be used.

In addition, as the polyol (b1-1), other polyols can be used, in addition to the examples described above. As the other polyols, for example, acrylic polyol is used.

In addition, as the polyisocyanate (b1-2), alicyclic polyisocyanate, aliphatic polyisocyanate, or aromatic polyisocyanate can be used, and alicyclic polyisocyanate is preferably used.

As the alicyclic polyisocyanate, for example, isophorone diisocyanate, 1,3-bis (isocyanatomethyl) cyclohexane, 4,4'-dicyclohexylmethane diisocyanate, 2,4- and/or 2,6-methyl-cyclohexane diisocyanate, cyclohexylene diisocyanate, methylcyclohexylene diisocyanate, bis (2-isocyanatoethyl)-4-cyclohexylene-1,2-dicarboxylate and 2,5- and/or 2,6-norbornane diisocyanate, dimer acid diisocyanate, and bicycloheptane triisocyanate can be used alone or in combination of two or more kinds thereof.

As a method of reacting the polyol (b1-1) and polyisocyanate (b1-2) with each other to produce polyurethane (b1), for example, a method of removing moisture by heating the polyol (b1-1) put in a reaction vessel under the condition of normal pressure or reduced pressure, and collectively or separately supplying and reacting the polyisocyanate (b1-2) is used.

In the reaction performed between the polyol (b1-1) and the polyisocyanate (b1-2), an equivalent ratio of an isocyanate group including the polyisocyanate (b1-2) and a hydroxyl group including the polyol (b1-1) (hereinafter, referred to as [NCO/OH equivalent ratio]) is preferably 1.0 to 20.0, more preferably 1.1 to 13.0, even more preferably 1.2 to 5.0, and particularly preferably 1.5 to 3.0.

The reaction conditions (temperature, time, and the like) of the polyol (b1-1) and the polyisocyanate (b1-2) may be suitably set by considering various conditions such as safety, quality, cost, and the like, and not particularly limited, and for example, a reaction temperature is preferably 70° C. to 120° C., and a reaction time is preferably 30 minutes to 5 hours.

In a case of reacting the polyol (b1-1) and the polyisocyanate (b1-2) with each other, a tertiary amine catalyst or an organic metal catalyst can be used, for example, as a catalyst, if necessary.

In addition, the reaction may be performed in an environment without a solvent, or may be performed under the presence of an organic solvent.

As the organic solvent, for example, an ester-based solvent such as methyl acetate, ethyl acetate, propyl acetate, or butyl acetate, a ketone-based solvent such as acetone, methyl ethyl ketone, methyl butyl ketone, or cyclohexanone, an ether ester-based solvent such as methyl cellosolve acetate or butyl cellosolve acetate, an aromatic hydrocarbon-based solvent such as toluene or xylene, and an amide-based solvent such as dimethylformamide or dimethylacetamide can be used alone or in combination of two or more kinds thereof. The organic solvent may be removed by a suitable method such as reduced pressure heating or normal pressure drying, in the middle of the producing of the polyurethane (b1) or after producing the polyurethane (b1).

In the polyurethane (b1) obtained by the method described above, the softening temperature is preferably equal to or higher than 40° C. and more preferably equal to or higher than 50° C. In addition, the softening temperature indicates a value measured based on JIS K 2207. The upper limit of the softening temperature is suitably equal to or lower than 100° C.

As the base material, in order to further improve adhesion to the pressure-sensitive adhesive layer, a base material on which a primer layer is provided, or a base material subjected to a surface treatment such as a roughening treatment, a corona discharge treatment, a chromic acid treatment, aflame treatment, a hot air treatment, an ozone treatment, a ultraviolet irradiation treatment, or an oxidation treatment on the surface by a sand blast method or a solvent treatment method can be used.

Examples of the producing method of the base material include a cast method using an extrusion die, a uniaxial stretching method, a sequential quadratic stretching method, a simultaneously biaxial stretching method, an inflation method, a tube method, a calendar method, and a solution method. Among these, the producing method by the cast method using an extrusion die, the uniaxial stretching method, the sequential quadratic stretching method, the simultaneously biaxial stretching method, the inflation method, or the tube method can be suitably used, and the method may be selected in accordance with a mechanical strength necessary for the pressure-sensitive adhesive tape of the invention.

The base material may have a single layer structure or a multi-layer structure having two layers or three or more layers. In a case of the multi-layer structure, at least one layer is preferably a layer having the resin composition described above, because necessary mechanical properties are easily exhibited. In addition, for example, a base material having a three-layer structure can be obtained by a method of coextrusion of a thermoplastic resin such as polypropylene and the styrene-isoprene-styrene copolymer. This can be used as a suitable configuration, in a case of applying suitable dimensional stability or stiffness for the pressure-sensitive adhesive tape of the invention, for example.

EXAMPLES

Hereinafter, the specific description with reference to examples is as follows, but the invention is not limited thereto.

Adjustment of Pressure-Sensitive Adhesive (1)

60 parts by mass of n-butyl acrylate, 35.95 parts by mass of 2-ethylhexyl acrylate, 4.0 parts by mass of acrylic acid, 0.05 parts by mass of 4-hydroxybutyl acrylate, and 0.2 parts by mass of 2,2'-azobisisobutylnitrile as a polymerization initiator were dissolved in a mixed solvent of 50 parts by mass of ethyl acetate and 20 parts by mass of n-hexane, and these were polymerized at 70° C. for 8 hours, in a reaction vessel including a stirrer, a reflux cooler, a thermometer, a dropping funnel, and a nitrogen gas introduction port, and accordingly, an acrylic copolymer solution (1) having a weight average molecular weight of 700,000 was obtained.

Next, 20 parts by mass of a polymerized rosin ester-based resin (manufactured by Arakawa Chemical Industries, Ltd., D-125) and 10 parts by mass of disproportionated rosin ester (A100 manufactured by Arakawa Chemical Industries, Ltd.) were added to 100 parts by mass of the solid content of the acrylic copolymer solution (1) having a weight average molecular weight of 700,000, the concentration of the solid content was adjusted to 45% by mass using ethyl acetate, and accordingly, an acrylic pressure-sensitive adhesive composition (1) was obtained.

Then, 100 parts by mass (solid content: 45 parts by mass) of the acrylic pressure-sensitive adhesive composition (1) and 2.0 parts by mass of the crosslinking agent (manufactured by DIC Corporation, BURNOCK NC-40, isocyanate-based crosslinking agent, solid content of 40% by mass, ethyl acetate solution) were mixed with each other, these were mixed for 10 minutes using a dispersion stirrer, and accordingly, a pressure-sensitive adhesive (1) was obtained.

Adjustment of Pressure-Sensitive Adhesive (2)

75.94 parts by mass of n-butyl acrylate, 5 parts by mass of 2-ethylhexyl acrylate, 15 parts by mass of cyclohexyl acrylate, 4 parts by mass of acrylic acid, 0.06 parts by mass of 4-hydroxybutyl acrylate, and 200 parts by mass of ethyl acetate were put in a reaction vessel including a stirrer, a reflux cooler, a nitrogen introduction tube, and a thermometer, and heated to 65° C. while blowing nitrogen while stirring. Then, 4 parts by mass (solid content: 2.5% by mass) of 2,2'-azobisisobutyronitrile dissolved in ethyl acetate in advance was added to the mixture, and held at 65° C. for 10 hours while stirring. Next, the mixture was diluted by 98 parts by mass of ethyl acetate and filtered with a 200 mesh wire net, and accordingly, an acrylic copolymer solution (2) having a weight average molecular weight of 1,600,000 was obtained.

Then, 5 parts by mass of the polymerized rosin ester-based pressure-sensitive adhesive applying resin D-125 (manufactured by Arakawa Chemical Industries, Ltd.) and 15 parts by mass of petroleum-based pressure-sensitive adhesive applying resin FTR 6125 (manufactured by Mitsui Chemicals) were mixed with each other and stirred with respect to 100 parts by mass of the solid content of the acrylic copolymer solution (2) having a weight average molecular weight of 1,600,000, the concentration of the solid content was adjusted to 31% by mass by mass using ethyl acetate, and accordingly, an acrylic pressure-sensitive adhesive composition (2) was obtained.

Next, 100 parts by mass (solid content: 31 parts by mass) of the acrylic pressure-sensitive adhesive composition (2) and 1.3 parts by mass of a crosslinking agent (manufactured by DIC Corporation, BURNOCK NC-40, isocyanate-based crosslinking agent, solid content of 40% by mass, ethyl acetate solution) as a crosslinking agent were mixed with each other, these were mixed for 10 minutes using a dispersion stirrer, and accordingly, a pressure-sensitive adhesive (2) was obtained.

Adjustment of Pressure-Sensitive Adhesive (3)

100 parts by mass of a resin composition (2) (mixture of the styrene-isoprene copolymer and the styrene-isoprene-styrene copolymer, styrene-derived structural unit represented by Chemical Formula (1): 24% by mass, rate of styrene-isoprene copolymer with respect to a total amount of the resin composition 2: 67% by mass), 40 parts by mass of Quintone G115 ($C_5/C_9$ petroleum resin manufactured by Zeon Corporation, softening point: 115° C.), 30 parts by mass of Pencel D-160 (polymerized rosin ester resin manufactured by manufactured by Arakawa Chemical Industries, Ltd., softening point: 150° C. to 165° C.), 5 parts by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate] methane) were mixed with each other and dissolved in 100 parts by mass of toluene as a solvent, and accordingly, a pressure-sensitive adhesive (3) was obtained.

Adjustment of Pressure-Sensitive Adhesive (4)

100 parts by mass of a resin composition (1) (mixture of the styrene-isoprene copolymer and the styrene-isoprene-styrene copolymer, styrene-derived structural unit represented by Chemical Formula (1): 25% by mass, rate of styrene-isoprene copolymer with respect to a total amount of the resin composition 1: 17% by mass), 16 parts by mass of Quintone G115 ($C_5/C_9$ petroleum resin manufactured by Zeon Corporation, softening point: 115° C.), 12 parts by mass of Pencel D-160 (polymerized rosin ester resin manufactured by manufactured by Arakawa Chemical Industries, Ltd., softening point: 150° C. to 165° C.), 2 parts by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate] methane) were mixed with each other and dissolved in 100 parts by mass of toluene as a solvent, and accordingly, a pressure-sensitive adhesive (4) was obtained.

Adjustment of Pressure-Sensitive Adhesive (5)

100 parts by mass of the resin composition (1), 8 parts by mass of Quintone G115 ($C_5/C_9$ petroleum resin manufactured by Zeon Corporation, softening point: 115° C.), 6 parts by mass of Pencel D-160 (polymerized rosin ester resin manufactured by manufactured by Arakawa Chemical Industries, Ltd., softening point: 150° C. to 165° C.), 1 part by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate] methane) were mixed with each other and dissolved in 100 parts by mass of toluene as a solvent, and accordingly, a pressure-sensitive adhesive (5) was obtained.

Adjustment of Pressure-Sensitive Adhesive (6)

100 parts by mass of the resin composition (1), 24 parts by mass of Quintone G115 ($C_5/C_9$ petroleum resin manufactured by Zeon Corporation, softening point: 115° C.), 18 parts by mass of Pencel D-160 (polymerized rosin ester resin manufactured by manufactured by Arakawa Chemical Industries, Ltd., softening point: 150° C. to 165° C.), 3 parts by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate] methane) were mixed with each other and dissolved in 100 parts by mass of toluene as a solvent, and accordingly, a pressure-sensitive adhesive (6) was obtained.

Adjustment of Pressure-Sensitive Adhesive (7)

100 parts by mass of the resin composition (2), 16 parts by mass of Quintone G115 ($C_5/C_9$ petroleum resin manufactured by Zeon Corporation, softening point: 115° C.), 12 parts by mass of Pencel D-160 (polymerized rosin ester resin manufactured by manufactured by Arakawa Chemical Industries, Ltd., softening point: 150° C. to 165° C.), 2 parts by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate] methane) were mixed with each other and dissolved in 100 parts by mass of toluene as a solvent, and accordingly, a pressure-sensitive adhesive (7) was obtained.

Adjustment of Pressure-Sensitive Adhesive (8)

100 parts by mass of SK-Dyne 909A (manufactured by Soken Chemical & Engineering Co., Ltd., acrylic pressure-sensitive adhesive, solid content: 24.5% by mass), 1 part by mass of MA220 (manufactured by Mitsubishi Chemical Corporation, carbon black), and 0.7 parts by mass of CORONATE L-45 (manufactured by Nippon Polyurethane Industry Co., Ltd., isocyanate-based crosslinking agent, solid content: 45% by mass) were mixed with each other and stirred for 15 minutes, and accordingly, a pressure-sensitive adhesive (8) was prepared.

Adjustment of Pressure-Sensitive Adhesive (9)

100 parts by mass of a resin composition (4) (mixture of the styrene-isoprene copolymer and the styrene-isoprene-styrene copolymer, styrene-derived structural unit represented by Chemical Formula (1): 15% by mass, rate of styrene-isoprene copolymer with respect to a total amount of the resin composition 4: 78% by mass), 40 parts by mass of Quintone G115 ($C_5/C_9$ petroleum resin manufactured by Zeon Corporation, softening point: 115° C.), 30 parts by mass of Pencel D-160 (polymerized rosin ester resin manufactured by manufactured by Arakawa Chemical Industries, Ltd., softening point: 150° C. to 165° C.), 5 parts by mass of Nisseki Polybutene HV-50 (Polybutene manufactured by JXTG Nippon Oil & Energy Corporation, softening point: −12.5° C.), and 1 part by mass of an age resistor (tetrakis-[methylene-3-(3'5'-di-t-butyl-4-hydroxyphenyl) propionate]

methane) were mixed with each other and dissolved in 100 parts by mass of toluene as a solvent, and accordingly, a pressure-sensitive adhesive (9) was obtained.

Example 1

The pressure-sensitive adhesive (1) was applied on a release liner by an applicator so that a thickness after drying becomes 5 μm, and dried at 80° C. for 3 minutes, and accordingly, a pressure-sensitive adhesive (1) was produced.

The resin composition (1) was heat-pressed (pressure: 0.5 MPa, press plate temperature: 130° C., press time: 2 minutes), and accordingly, a base material having a thickness of 200 μm was produced. The pressure-sensitive adhesive layer (1) produced as described above was bonded to both surfaces thereof, pressurized at 0.2 MPa, and laminated, and accordingly, a pressure-sensitive adhesive tape was produced.

Example 2

A pressure-sensitive adhesive tape was produced in the same manner as in Example 1, except that the thickness of the resin composition (1) was set as 400 μm.

Example 3

A pressure-sensitive adhesive tape was produced in the same manner as in Example 1, except that the thickness of the resin composition (1) was set as 1,000 μm.

Example 4

The resin composition (2) was heat-pressed (pressure: 0.5 MPa, press plate temperature: 130° C., press time: 2 minutes), and accordingly, a base material having a thickness of 200 μm was produced. The pressure-sensitive adhesive layer (1) produced as described above was bonded to both surfaces thereof, pressurized at 0.2 MPa, and laminated, and accordingly, a pressure-sensitive adhesive tape was produced.

Example 5

A pressure-sensitive adhesive tape was produced, in the same manner as in Example 4, except that the thickness of the resin composition (2) was set as 1,000 μm.

Example 6

The pressure-sensitive adhesive (1) was applied on a release liner with an applicator so that a thickness after drying becomes 25 μm, and dried at 80° C. for 3 minutes, and accordingly, a pressure-sensitive adhesive (2) was produced.

Then, the pressure-sensitive adhesive layer (2) produced as described above was bonded to both surfaces of a sheet-like resin composition (3) (ester-based polyurethane compound) having a thickness of 100 μm, pressurized at 0.2 MPa, and laminated, and accordingly, a pressure-sensitive adhesive tape was produced.

Example 7

The pressure-sensitive adhesive (2) was applied on a surface of a release liner so that a thickness of the pressure-sensitive adhesive layer after drying becomes 5 μm, and dried at 85° C. for 3 minutes, and accordingly, a pressure-sensitive adhesive layer (3) was produced.

The resin composition (1) was heat-pressed (pressure: 0.5 MPa, press plate temperature: 130° C., press time: 2 minutes), and accordingly, a base material having a thickness of 200 μm was produced. The pressure-sensitive adhesive layer (3) produced as described above was bonded to both surfaces thereof, pressurized at 0.2 MPa, and laminated, and accordingly, a pressure-sensitive adhesive tape was produced.

Example 8

The pressure-sensitive adhesive (3) was applied on release paper with an applicator so that a thickness after drying becomes 5 μm, and dried at 80° C. for 3 minutes, and accordingly, a pressure-sensitive adhesive (4) was produced.

The resin composition (1) was heat-pressed (pressure: 0.5 MPa, press plate temperature: 130° C., press time: 2 minutes), and accordingly, a base material having a thickness of 200 μm was produced. The pressure-sensitive adhesive layer (4) produced as described above was bonded to both surfaces thereof, pressurized at 0.2 MPa, and laminated, and accordingly, a pressure-sensitive adhesive tape was produced.

Example 9

The pressure-sensitive adhesive (3) was applied on a release liner with an applicator so that a thickness after drying becomes 25 μm, and dried at 80° C. for 3 minutes, and accordingly, a pressure-sensitive adhesive (5) was produced.

The resin composition (1) was heat-pressed (pressure: 0.5 MPa, press plate temperature: 130° C., press time: 2 minutes), and accordingly, a base material having a thickness of 200 μm was produced. The pressure-sensitive adhesive layer (5) produced as described above was bonded to both surfaces thereof, pressurized at 0.2 MPa, and laminated, and accordingly, a pressure-sensitive adhesive tape was produced.

Example 10

The pressure-sensitive adhesive (4) was applied on release paper with an applicator so that a thickness after drying becomes 200 μm, and dried at 80° C. for 3 minutes, and accordingly, a pressure-sensitive adhesive tape was produced.

Example 11

The pressure-sensitive adhesive (5) was applied on release paper with an applicator so that a thickness after drying becomes 200 μm, and dried at 80° C. for 3 minutes, and accordingly, a pressure-sensitive adhesive tape was produced.

Example 12

The pressure-sensitive adhesive (6) was applied on release paper with an applicator so that a thickness after drying becomes 200 μm, and dried at 80° C. for 3 minutes, and accordingly, a pressure-sensitive adhesive tape was produced.

Example 13

The pressure-sensitive adhesive (7) was applied on release paper with an applicator so that a thickness after drying becomes 450 μm, and dried at 80° C. for 3 minutes, and accordingly, a pressure-sensitive adhesive tape was produced.

Example 14

A pressure-sensitive adhesive tape was produced in the same manner as in Example 13, except that the thickness of the pressure-sensitive adhesive (7) was set as 750 μm.

Example 15

A pressure-sensitive adhesive tape was produced in the same manner as in Example 13, except that the thickness of the pressure-sensitive adhesive (7) was set as 300 μm.

Example 16

The pressure-sensitive adhesive (8) was applied on a release liner with an applicator so that a thickness after drying becomes 50 μm, and dried at 80° C. for 3 minutes, and accordingly, a pressure-sensitive adhesive (6) was produced.
The resin composition (1) (mixture of the styrene-isoprene copolymer and the styrene-isoprene-styrene copolymer, styrene-derived structural unit represented by Chemical Formula (1): 25% by mass, rate of styrene-isoprene copolymer with respect to a total amount of the resin composition 1: 17% by mass) was heat-pressed (pressure: 0.5 MPa, press plate temperature: 130° C., press time: 2 minutes), and accordingly, a base material having a thickness of 250 μm was produced. The pressure-sensitive adhesive layer (6) produced as described above was bonded to both surfaces thereof, pressurized at 0.2 MPa, and laminated, and accordingly, a pressure-sensitive adhesive tape was produced.

Example 17

A pressure-sensitive adhesive tape was produced in the same manner as in Example 16, except that 1 part by mass of BLACK PEARLS 120 (manufactured by Cabot Corporation, carbon black) was blended with the resin composition (1).

Comparative Example 1

A pressure-sensitive adhesive tape was produced in the same manner as in Example 1, except that a PET film having a thickness of 188 μm was used as the base material, instead of the resin composition (1).

Comparative Example 2

The resin composition (4) was heat-pressed (pressure: 0.5 MPa, press plate temperature: 130° C., press time: 2 minutes), and accordingly, a base material having a thickness of 200 μm was produced. The pressure-sensitive adhesive layer (1) produced as described above was bonded to both surfaces thereof, pressurized at 0.2 MPa, and laminated, and accordingly, a pressure-sensitive adhesive tape was produced.

Comparative Example 3

The pressure-sensitive adhesive layer (1) produced as described above was bonded to both surfaces of the sheet-like resin composition 3 having a thickness of 100 μm, pressurized at 0.2 MPa, and laminated, and accordingly, a pressure-sensitive adhesive tape was produced.

Comparative Example 4

The pressure-sensitive adhesive (1) was applied on a release liner by an applicator so that a thickness after drying becomes 200 μm, and dried at 65° C. for 10 minutes, and accordingly, a pressure-sensitive adhesive tape was produced.

Comparative Example 5

The pressure-sensitive adhesive (8) was applied on release paper by an applicator so that a thickness after drying becomes 200 μm, and dried at 65° C. for 10 minutes, and accordingly, a pressure-sensitive adhesive tape was produced.

Comparative Example 6

The pressure-sensitive adhesive (3) was applied on a release liner by an applicator so that a thickness after drying becomes 200 μm, and dried at 80° C. for 3 minutes, and accordingly, a pressure-sensitive adhesive tape was produced.

Comparative Example 7

A pressure-sensitive adhesive tape was produced in the same manner as in Example 1, except that the thickness of the resin composition (1) was set as 100 μm.

Regarding the pressure-sensitive adhesive tapes, the base materials, and the pressure-sensitive adhesive layers produced in Examples 1 to 17 and Comparative Examples 1 to 7, tests were performed by the method shown below, and evaluation results were shown in Tables 1 and 2.

Stress at Break, Elongation at Break, Stress at 25% Elongation, and Stress at 50% Elongation of Pressure-Sensitive Adhesive Tape, Base Material, and Pressure-Sensitive Adhesive The stress at break, the elongation at break, the stress at 25% elongation, and the stress at 50% elongation of the pressure-sensitive adhesive tape were measured by punching the pressure-sensitive adhesive tape in a dumbbell shape having a length of marked line of 20 mm and a width of 10 mm, and pulling in a length direction at a tension rate of 300 mm/min, by using a Tensilon tension tester, under the condition of a measurement atmosphere of 23° C. and 50% RH.

Storage Elastic Modulus E' of Pressure-Sensitive Adhesive Tape and Base Material Each of the pressure-sensitive adhesive tapes obtained in the examples and the comparative examples which were punched in a shape of a test piece type 5 of JIS K 7127 by a dumbbell cutter was set as a test piece.
The measurement regarding the test piece was performed by a dynamic viscoelasticity measuring device RSA-II (frequency: 1 Hz, heating rate: 3° C./min) manufactured by Rheometrics, and a storage elastic modulus E' at 23° C. was obtained.

Storage Elastic Modulus G' of Pressure-Sensitive Adhesive Layer

The storage elastic modulus G' of the invention is a value obtained by setting the pressure-sensitive adhesive overlapped to a thickness of 2 mm as a test piece, mounting a parallel plate having a diameter of 7.9 mm on a viscoelasticity tester ARES 2kSTD manufactured by Rheometrics, inserting the test piece, and measuring at a frequency of 1 Hz.

180° Peel Strength

A pressure-sensitive adhesive tape sample having a width of 20 mm at 23° C. was bonded to a stainless steel plate and pressurized by one reciprocating of 2 kg roller. The sample was left still at 23° C. for 1 hour and pulled in 180° C. direction at a tension rate of 300 mm/min by using a Tensilon tension tester, and adhesion was measured.

Evaluation Method of Holding Force

The pressure-sensitive adhesive tape having one pressure-sensitive adhesive surface which was lined with a polyethylene terephthalate film having a thickness of 25 μm and cut to have a width of 20 mm and a length of 100 mm, was loaded on a surface of a clean and smooth stainless steel plate (hairline polishing treatment by No. 360 waterproof abrasive paper) in the atmosphere of 23° C. and 50% RH, so that the size of the bonding area becomes 20 mm×20 mm, these were bonded by reciprocating the upper surface thereof with a 2 kg roller, and left still in the environment of 23° C. for 1 hour, and accordingly, a test piece was produced.

In a state where the stainless steel plate configuring the test piece was fixed, the time from the point when the load of 1 kg was applied on the pressure-sensitive adhesive tape in the environment of 70° C. to the point when the pressure-sensitive adhesive tape drops from the stainless steel plate was measured. In a case where the pressure-sensitive adhesive tape was not dropped, even in a case where 24 hours or longer had elapsed, ">24" was noted.

Method for Evaluation of Shear Adhesion

The pressure-sensitive adhesive tape cut to have a width of 20 mm and a length of 20 mm was bonded on a surface of a clean and smooth stainless steel plate 1 (hairline polishing treatment by No. 360 waterproof abrasive paper) in the atmosphere of 23° C. and 50% RH, so that the size of the bonding area becomes 20 mm×20 mm, and the opposite surface thereof was bonded to a surface of a clean and smooth stainless steel plate 2 (hairline polishing treatment by No. 360 waterproof abrasive paper), so that the size of the bonding area becomes 20 mm×20 mm, these were bonded by reciprocating the upper surface thereof with 5 kg roller, and left still in the environment of 23° C. for 24 hours, and accordingly, a test piece was produced.

In a state where the stainless steel plate 1 configuring the test piece was fixed, the stainless steel plate 2 was pulled in a shear direction of the pressure-sensitive adhesive tape at a rate of 300 mm/min by using a Tensilon tension tester, in the atmosphere of 23° C. and 50% RH, and shear adhesion was measured.

Evaluation Method of Crack Adhesion

The pressure-sensitive adhesive tape cut to have a width of 20 mm and a length of 20 mm was bonded to on a surface of a clean and smooth stainless steel plate 1 (A1050) in the atmosphere of 23° C. and 50% RH, so that the size of the bonding area becomes 20 mm×20 mm, and the opposite surface thereof was bonded to a surface of a clean and smooth stainless steel plate 2 (A1050), so that the size of the bonding area becomes 20 mm×20 mm, these were bonded by reciprocating the upper surface thereof with 5 kg roller, and left still in the environment of 23° C. for 24 hours, and accordingly, a test piece was produced.

In a state where the stainless steel plate 1 configuring the test piece was fixed, the stainless steel plate 2 was pulled in a crack direction of the pressure-sensitive adhesive tape at a rate of 300 mm/min by using a Tensilon tension tester, in the atmosphere of 23° C. and 50% RH, and crack adhesion was measured.

Re-Peeling Properties

The pressure-sensitive adhesive tape having a width of 10 mm and a length of 60 mm was bonded to a clean and smooth stainless steel plate, in a state where a grab having a width of 10 mm and a length of 10 mm was pulled out, the opposite surface thereof was bonded to a clean and smooth stainless steel plate, and pressurized by reciprocating with a roller while applying a 2 kg load, and this was set as a test sample. After the bonding, the test sample was left still in the atmosphere of 23° C. and 50% RH for 3 days, and the grab portion of the pressure-sensitive adhesive tape was stretched by hand in a horizontal direction of the pressure-sensitive adhesive tape at a rate of approximately 300 mm/min, at 23° C. of 50% RH.

While the test was performed three times, a degree of a residue of the pressure-sensitive adhesive on an adherend, after cutting of the pressure-sensitive adhesive tape and the peeling of the pressure-sensitive adhesive tape was visually evaluated based on the following standard.

Evaluation

A: The tape was cleanly peeled off three times.

B: The tape was cleanly peeled off twice, but the tape was cut once. The area of the pressure-sensitive adhesive tape remaining without being stretched was ⅕ or less of the initial bonding area.

C: The tape was cleanly peeled off twice, but the tape was cut once. The area of the pressure-sensitive adhesive tape remaining without being stretched was ⅕ or more of the initial bonding area.

D: The pressure-sensitive adhesive tape could not be peeled off. Alternatively, the tape was cut twice or more.

Rigid Body Conformity

The pressure-sensitive adhesive tape having a width of 20 mm and a length of 20 mm was bonded to a transparent acrylic plate having a width of 30 mm and a length of 30 mm, a transparent acrylic plate having a width of 30 mm and a length of 30 mm was bonded to the opposite surface of the pressure-sensitive adhesive tape, and this was set as a test piece. After the bonding, the test sample was left still in the atmosphere of 23° C. and 50% RH for 24 hours and visually observed through the acrylic plate, and a percentage of the area (bonding area) of the portion where the pressure-sensitive adhesive tape and the acrylic plate were bonded to each other, with respect to the area of the pressure-sensitive adhesive tape was evaluated.

Evaluation

A: Bonding area is 100% to 60% of the area of the pressure-sensitive adhesive tape.

B: Bonding area is 60% to 40% of the area of the pressure-sensitive adhesive tape.

C: Bonding area is 40% to 30% of the area of the pressure-sensitive adhesive tape.

D: Bonding area is less than 30% of the area of the pressure-sensitive adhesive tape.

TABLE 1

| | | Example 1 | Example 2 | Example 3 | Example 4 | Example 5 | Example 6 | Example 7 |
|---|---|---|---|---|---|---|---|---|
| Base material | Composition | Resin composition (1) | Resin composition (1) | Resin composition (1) | Resin composition (2) | Resin composition (2) | Resin composition (3) | Resin composition (1) |
| | Thickness [μm] | 200 | 400 | 1000 | 400 | 1000 | 100 | 200 |
| | Elastic modulus E'[Pa] (23° C.) | 2.16E+06 | 2.16E+06 | 2.16E+06 | 1.41E+06 | 1.41E+06 | 1.12E+07 | 2.16E+06 |
| | Stress at 25% Elongation [MPa] | 0.95 | 0.95 | 0.95 | 0.60 | 0.60 | 5.15 | 0.95 |
| | Stress at 50% Elongation [MPa] | 1.15 | 1.15 | 1.15 | 0.70 | 0.70 | 6.05 | 1.15 |
| | Stress at Break (MD)[MPa] | 16.62 | 16.62 | 16.62 | 5.16 | 5.16 | 53.70 | 16.62 |
| | Elongation at Break (MD)[%] | 1500 | 1500 | 1500 | 1700 | 1700 | 700 | 1500 |
| Pressure-sensitive adhesive | Composition | Pressure-sensitive adhesive (1) | Pressure-sensitive adhesive (1) | Pressure-sensitive adhesive (1) | Pressure-sensitive adhesive (1) | Pressure-sensitive adhesive (1) | Pressure-sensitive adhesive (1) | Pressure-sensitive adhesive (2) |
| | Elastic modulus G'(23° C.)[Pa] | 7.20E+04 | 7.20E+04 | 7.20E+04 | 7.20E+04 | 7.20E+04 | 7.20E+04 | 9.66E+04 |
| | Stress at 25% Elongation [MPa] | 0.04 | 0.04 | 0.04 | 0.04 | 0.04 | 0.04 | 0.08 |
| | Stress at 50% Elongation [MPa] | 0.05 | 0.05 | 0.05 | 0.05 | 0.05 | 0.05 | 0.08 |
| | Stress at Break (MD)[MPa] | 1.36 | 1.36 | 1.36 | 1.36 | 1.36 | 1.36 | 0.76 |
| | Elongation at Break (MD)[%] | 1850 | 1850 | 1850 | 1850 | 1850 | 1850 | 1100 |
| | Thickness [μm] | 5 | 5 | 5 | 5 | 5 | 30 | 5 |
| Tape | Elastic modulus E'(23° C.)[Pa] | 2.10E+06 | 2.11E+06 | 2.13E+06 | 1.22E+06 | 1.40E+06 | 1.03E+07 | 2.11E+06 |
| | Thickness [μm] | 210 | 410 | 1010 | 410 | 1010 | 160 | 210 |
| | Stress at 25% Elongation [MPa] | 0.90 | 0.90 | 1.00 | 0.60 | 0.60 | 5.10 | 0.90 |
| | Stress at 50% Elongation [MPa] | 1.00 | 1.00 | 1.10 | 0.70 | 0.70 | 6.00 | 1.00 |
| | Stress at Break (MD)[MPa] | 15.00 | 16.00 | 16.00 | 5.15 | 5.00 | 54.00 | 15.00 |
| | Elongation at Break (MD)[%] | 1500 | 1500 | 1500 | 1700 | 1700 | 700 | 1500 |
| Re-peeling properties | | B | B | B | B | B | C | B |
| Holding force (70° C. 1 kg)[mm] | | >24 | >24 | >24 | >24 | >24 | >24 | >24 |
| 180° peel [N/20mm] | | 12 | 14 | 15 | 39.5 | 44 | 13 | 12 |
| Shear adhesion [N/4cm$^2$] | | 350 | 380 | 300 | 340 | 200 | 270 | 360 |
| Crack adhesion [N/4cm$^2$] | | 470 | 530 | 620 | 540 | 550 | 320 | 450 |
| Rigid body conformity | | B | A | A | A | A | D | B |

TABLE 2

| | | Example 8 | Example 9 | Example 10 | Example 11 |
|---|---|---|---|---|---|
| Base material | Composition | Resin composition (1) | Resin composition (1) | — | — |
| | Thickness [μm] | 200 | 200 | — | — |
| | Elastic modulus E'[Pa] (23° C.) | 2.16E+06 | 2.16E+06 | — | — |
| | Stress at 25% Elongation [MPa] | 0.95 | 0.95 | — | — |
| | Stress at 50% Elongation [MPa] | 1.14 | 1.14 | — | — |
| | Stress at Break (MD)[MPa] | 16.62 | 16.62 | — | — |
| | Elongation at Break (MD)[%] | 1500 | 1500 | — | — |
| Pressure-sensitive adhesive | Composition | Pressure-sensitive adhesive (3) | Pressure-sensitive adhesive (3) | Pressure-sensitive adhesive (4) | Pressure-sensitive adhesive (5) |
| | Elastic modulus G'(23° C.)[Pa] | 4.81E+05 | 4.81E+05 | — | — |
| | Stress at 25% Elongation [MPa] | 0.20 | 0.20 | — | — |
| | Stress at 50% Elongation [MPa] | 0.25 | 0.25 | — | — |
| | Stress at Break (MD)[MPa] | 2.40 | 2.40 | — | — |
| | Elongation at Break (MD)[%] | 1600 | 1600 | — | — |
| | Thickness [μm] | 5 | 25 | 200 | 200 |
| Tape | Elastic modulus E'(23° C.)[Pa] | 2.13E+06 | 2.10E+06 | 9.34E+05 | 5.59E+05 |
| | Thickness [μm] | 210 | 210 | 200 | 200 |
| | Stress at 25% Elongation [MPa] | 0.90 | 0.90 | 0.47 | 0.21 |
| | Stress at 50% Elongation [MPa] | 1.00 | 1.00 | 0.65 | 0.27 |
| | Stress at Break (MD)[MPa] | 15.00 | 15.00 | 12.00 | 11.00 |
| | Elongation at Break (MD)[%] | 1500 | 1500 | 1400 | 1400 |

TABLE 2-continued

| | | | | | |
|---|---|---|---|---|---|
| Re-peeling properties | | A | A | A | A |
| Holding force (70° C. 1 kg)[mm] | | >24 | >24 | >24 | >24 |
| 180° peel [N/20 mm] | | 15 | 23.5 | 18.5 | 21 |
| Shear adhesion [N/4cm²] | | 250 | 270 | 270 | 320 |
| Crack adhesion [N/4cm²] | | 390 | 470 | 380 | 330 |
| Rigid body conformity | | B | B | B | B |

| | | Example 12 | Example 13 | Example 14 | Example 15 |
|---|---|---|---|---|---|
| Base material | Composition | — | — | — | — |
| | Thickness [μm] | — | — | — | — |
| | Elastic modulus E'[Pa] (23° C.) | — | — | — | — |
| | Stress at 25% Elongation [MPa] | — | — | — | — |
| | Stress at 50% Elongation [MPa] | — | — | — | — |
| | Stress at Break (MD)[MPa] | — | — | — | — |
| | Elongation at Break (MD)[%] | — | — | — | — |
| Pressure-sensitive adhesive | Composition | Pressure-sensitive adhesive (6) | Pressure-sensitive adhesive (7) | Pressure-sensitive adhesive (7) | Pressure-sensitive adhesive (7) |
| | Elastic modulus G'(23° C.)[Pa] | — | — | — | — |
| | Stress at 25% Elongation [MPa] | — | — | — | — |
| | Stress at 50% Elongation [MPa] | — | — | — | — |
| | Stress at Break (MD)[MPa] | — | — | — | — |
| | Elongation at Break (MD)[%] | — | — | — | — |
| | Thickness [μm] | 200 | 450 | 750 | 300 |
| Tape | Elastic modulus E'(23° C.)[Pa] | 1.24E+06 | 7.74E+05 | 7.74E+05 | 7.74E+05 |
| | Thickness [μm] | 200 | 450 | 750 | 300 |
| | Stress at 25% Elongation [MPa] | 0.81 | 0.35 | 0.35 | 0.35 |
| | Stress at 50% Elongation [MPa] | 0.94 | 0.39 | 0.39 | 0.39 |
| | Stress at Break (MD)[MPa] | 14.00 | 4.60 | 4.60 | 4.60 |
| | Elongation at Break (MD)[%] | 1450 | 1600 | 1600 | 1600 |
| Re-peeling properties | | A | A | A | A |
| Holding force (70° C. 1 kg)[mm] | | >24 | >24 | >24 | >24 |
| 180° peel [N/20 mm] | | 13 | 45 | 55 | 35 |
| Shear adhesion [N/4cm²] | | 260 | 325 | 300 | 350 |
| Crack adhesion [N/4cm²] | | 360 | 340 | 420 | 380 |
| Rigid body conformity | | C | A | A | A |

TABLE 3

| | | Example 16 | Example 17 |
|---|---|---|---|
| Base material | Composition | Resin composition (1) | Resin composition (1) |
| | Thickness [μm] | 250 | 250 |
| | Elastic modulus E'[Pa] (23° C.) | 2.16E+06 | 2.34E+06 |
| | Stress at 25% Elongation [MPa] | 0.95 | 0.9 |
| | Stress at 50% Elongation [MPa] | 1.15 | 1.12 |
| | Stress at Break (MD)[MPa] | 16.62 | 14.7 |
| | Elongation at Break (MD)[%] | 1500 | 1700 |
| Pressure-sensitive adhesive | Composition | Pressure-sensitive adhesive (1) | Pressure-sensitive adhesive (1) |
| | Elastic modulus G'(23° C.)[Pa] | 2.70E+05 | 2.70E+05 |
| | Stress at 25% Elongation [MPa] | 0.13 | 0.13 |
| | Stress at 50% Elongation [MPa] | 0.15 | 0.15 |
| | Stress at Break (MD)[MPa] | 2.65 | 2.65 |
| | Elongation at Break (MD)[%] | 1300 | 1300 |
| | Thickness [μm] | 50 | 50 |
| Tape | Elastic modulus E'(23° C.)[Pa] | 2.10E+06 | 2.10E+06 |
| | Thickness [μm] | 350 | 350 |
| | Stress at 25% Elongation [MPa] | 0.95 | 0.92 |
| | Stress at 50% Elongation [MPa] | 1.01 | 0.99 |
| | Stress at Break (MD)[MPa] | 16.62 | 15.01 |
| | Elongation at Break (MD)[%] | 1500 | 1700 |
| Re-peeling properties | | B | B |
| Holding force (70° C. 1 kg)[mm] | | >24 | >24 |
| 180° peel | | 21 | 20 |
| Shear adhesion | | 390 | 390 |
| Crack adhesion | | 480 | 460 |
| Rigid body conformity | | A | A |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Base material | Composition | PET | Resin composition (4) | Resin composition (3) | — | — | — | Resin composition (1) |
|  | Thickness [μm] | 188 | 200 | 100 | — | — | — | 100 |
|  | Elastic modulus E'[Pa] (23° C.) | 8.96E+08 | 3.86E+05 | 1.12E+07 | — | — | — | 2.16E+06 |
|  | Stress at 25% Elongation [MPa] | 123.85 | 0.20 | 5.15 | — | — | — | 0.95 |
|  | Stress at 50% Elongation [MPa] | 123.85 | 0.28 | 6.05 | — | — | — | 1.15 |
|  | Stress at Break (MD)[MPa] | 234.20 | 2.16 | 53.70 | — | — | — | 16.62 |
|  | Elongation at Break (MD)[%] | 100.00 | 1850.00 | 700.00 | — | — | — | 1500 |
| Pressure-sensitive adhesive | Composition | Pressure-sensitive adhesive (1) | Pressure-sensitive adhesive (1) | Pressure-sensitive adhesive (1) | Pressure-sensitive adhesive (1) | Pressure-sensitive adhesive (8) | Pressure-sensitive adhesive (3) | Pressure-sensitive adhesive (1) |
|  | Elastic modulus G'(23° C.)[Pa] | 7.20E+04 | 7.20E+04 | 7.20E+04 | — | — | — | 7.20E+04 |
|  | Stress at 25% Elongation [MPa] | 0.04 | 0.04 | 0.04 | — | — | — | 0.04 |
|  | Stress at 50% Elongation [MPa] | 0.05 | 0.05 | 0.05 | — | — | — | 0.05 |
|  | Stress at Break (MD)[MPa] | 1.36 | 1.36 | 1.36 | — | — | — | 1.36 |
|  | Elongation at Break (MD)[%] | 1850.00 | 1850.00 | 1850.00 | — | — | — | 1850 |
|  | Thickness [μm] | 5 | 5 | 5 | — | — | — | 5 |
| Tape | Elastic modulus E'(23° C.)[Pa] | 8.95E+08 | 3.61E+05 | 1.03E+07 | 4.87E+04 | 2.82E+05 | 4.81E+05 | 1.60E+06 |
|  | Thickness [μm] | 198 | 210 | 110 | 200 | 200 | 200 | 110 |
|  | Stress at 25% Elongation [MPa] | 125.85 | 0.20 | 5.15 | 0.04 | 0.20 | 0.20 | 0.90 |
|  | Stress at 50% Elongation [MPa] | 151.79 | 0.28 | 6.05 | 0.05 | 0.20 | 0.25 | 1.00 |
|  | Stress at Break (MD)[MPa] | 230.00 | 1.90 | 53.70 | 1.36 | 1.25 | 2.20 | 15.00 |
|  | Elongation at Break (MD)[%] | 120.00 | 1850.00 | 700.00 | 1850.00 | 2100.00 | 1600.00 | 1500 |
| Re-peeling properties |  | D | D | C | D | D | D | D |
| Holding force (70° C. 1 kg)[mm] |  | >24 | 1.5 | >24 | 2.5 | 7.5 | >24 | >24 |
| 180° peel [N/20 mm] |  | 0.85 | 32.5 | 0.8 | 25 SS | 50 CF | 40 SS | 11.5 |
| Shear adhesion [N/4cm$^2$] |  | 0 | 470 | 250 | 360 | 320 | 370 | 320 |
| Crack adhesion [N/4cm$^2$] |  | 3.5 | 400 | 260 | 235 | 210 | 300 | 340 |
| Rigid body conformity |  | D | B | D | B | B | B | D |

According to the results described above, it was found that, in Examples 1 to 17 of the invention, both adhesion and conformity with respect to a hard adherend are excellent, the pressure-sensitive adhesive tape can be easily peeled off by stretching the pressure-sensitive adhesive tape in a horizontal direction, without remaining the pressure-sensitive adhesive, and the re-peeling properties are excellent. In contrast, in Comparative Examples 1 to 7, the adhesion, the conformity, and the re-peeling properties could not be satisfied, at the same time.

The invention claimed is:

1. A method for peeling a pressure-sensitive adhesive tape from adherents, the method comprising:
   providing a pressure-sensitive adhesive tape which has bonded a first adherent to a second adherent, a part of the pressure-sensitive adhesive tape being overhanded from the first adherent and the second adherent,
   pulling the part of the pressure-sensitive adhesive tape in a horizontal direction to peel off the pressure-sensitive adhesive tape from between the first adherent and the second adherent,
   the pressure-sensitive adhesive tape comprising:
   a base material layer; and
   a pressure-sensitive adhesive layer disposed on both surfaces of the base material layer,
   the pressure-sensitive adhesive tape having a thickness greater than 150 μm and smaller than 1500 μm, an elongation at break of 600% to 3,000%, and a stress at break of 2.5 to 80.0 MPa,
   wherein the base material layer is formed from a block copolymer of a polyaromatic vinyl compound and a conjugated diene compound; and
   the pressure-sensitive adhesive layer is disposed on the base material layer, the pressure-sensitive adhesive layer comprising an acryl-based pressure sensitive adhesive or a rubber-based pressure sensitive adhesive.

2. The method for peeling pressure-sensitive adhesive tape from adherents according to claim 1, wherein the pressure-sensitive adhesive tape has a stress at 25% elongation of 0.05 to 10 MPa.

3. The method for peeling pressure-sensitive adhesive tape from adherents according to claim 1, wherein the pressure-sensitive adhesive tape has a storage elastic modulus E' (23° C.) of $1.0\times10^4$ to $1.0\times10^8$ Pa.

4. The method for peeling pressure-sensitive adhesive tape from adherents according to claim 1, wherein the pressure-sensitive adhesive tape has a 180° peel strength equal to or more than 5 N/20 mm.

5. The method for peeling pressure-sensitive adhesive tape from adherents according to claim 1,
   wherein the pressure-sensitive adhesive layer contains a filler.

6. The method for peeling pressure-sensitive adhesive tape from adherents according to claim 5,
   wherein the filler is carbon.

7. The method for peeling pressure-sensitive adhesive tape from adherents according to claim 1, wherein the base material layer comprises 50% or more of a styrene-based resin, wherein the styrene-based resin is selected from the group consisting of a styrene-isoprene-styrene copolymer, a styrene-butadiene-styrene copolymer, a styrene-ethylene-butylene copolymer, and a styrene-ethylene propylene copolymer.

8. The method for peeling pressure-sensitive adhesive tape from adherents according to claim 1, wherein elongation at break is 1500% to 3,000%.

9. The method for peeling pressure-sensitive adhesive tape from adherents according to claim 1, wherein a ratio of a thickness of the pressure-sensitive adhesive layer to a thickness of the base material layer is ½ to 1/500.

10. The method for peeling according to claim 1, wherein the first adherent and the second adherent constitute an electronic equipment.

11. The method for peeling according to claim 1, wherein the pressure-sensitive adhesive tape is peeled off from between the first adherent and the second adherent without the pressure-sensitive adhesive tape being broken.

12. A method for peeling pressure-sensitive adhesive tape from adherents, the method comprising:
providing a pressure-sensitive adhesive tape bonding a first adherent to a second adherent, a part of the pressure-sensitive adhesive tape being overhanded from the first adherent and the second adherent,
pulling the part of the pressure-sensitive adhesive tape in a direction away from the first adherent and the second adherent to peel off the pressure-sensitive adhesive tape from between the first adherent and the second adherent,
the pressure-sensitive adhesive tape being of a single layer,
wherein the single layer is a pressure-sensitive adhesive layer formed from a composition of a mixture of acrylate monomers or a mixture of block copolymers of a polyaromatic vinyl compound and a conjugated diene compound,
wherein the pressure-sensitive adhesive tape has a thickness greater than 150 μm and smaller than 1500 μm, an elongation at break of 600% to 3,000%, a stress at break of 2.5 to 80.0 MPa, and a storage elastic modulus E' (23° C.) of $1.0 \times 10^4$ to $1.0 \times 10^8$ Pa,
wherein the pressure-sensitive adhesive tape has a 180° peel strength of 7 N/20 mm or more,
wherein the pressure-sensitive adhesive layer comprises a block copolymer of a polyaromatic vinyl compound and a conjugated diene compound.

13. The method for peeling pressure-sensitive adhesive tape from adherents according to claim 12, wherein the elongation at break is 1400% to 3,000%.

14. The method for peeling pressure-sensitive adhesive tape from adherents according to claim 12, wherein the pressure-sensitive adhesive tape has a 180° peel strength ranging from 7 N/20 mm to 55 N/20 mm.

15. The method for peeling according to claim 12, wherein the first adherent and the second adherent constitute an electronic equipment.

16. The method for peeling according to claim 12, wherein the pressure-sensitive adhesive tape is peeled off from between the first adherent and the second adherent without the pressure-sensitive adhesive tape being broken.

17. A method for peeling a pressure-sensitive adhesive tape from adherents, the method comprising:
providing a pressure-sensitive adhesive tape which has bonded a first adherent to a second adherent, a part of the pressure-sensitive adhesive tape being overhanded from the first adherent and the second adherent,
pulling the part of the pressure-sensitive adhesive tape in a horizontal direction to peel off the pressure-sensitive adhesive tape from between the first adherent and the second adherent,
the pressure-sensitive adhesive tape comprising:
a base material layer; and
a pressure-sensitive adhesive layer disposed on both surfaces of the base material layer,
the pressure-sensitive adhesive tape having a thickness greater than 150 μm and smaller than 1500 μm, an elongation at break of 600% to 3,000%, and a stress at break of 2.5 to 80.0 MPa,
wherein the pressure-sensitive adhesive tape has a crack adhesion ranging from 390 N/4 $cm^2$ to 620 N/4 $cm^2$ when the pressure-sensitive adhesive tape is pulled in a crack direction of the pressure-sensitive adhesive tape at a rate of 300 mm/min in an atmosphere of 23° C. and 50% RH.

18. The method for peeling according to claim 17, wherein the pressure-sensitive adhesive tape is peeled off from between the first adherent and the second adherent without the pressure-sensitive adhesive tape being broken.

19. The method for peeling pressure-sensitive adhesive tape from adherents according to claim 17, wherein the elongation at break is 1500% to 3,000%.

20. The method for peeling pressure-sensitive adhesive tape from adherents according to claim 17, wherein the pressure-sensitive adhesive tape has a stress at 25% elongation of 0.05 to 10 MPa.

21. The method for peeling pressure-sensitive adhesive tape from adherents according to claim 17, wherein the pressure-sensitive adhesive tape has a storage elastic modulus E' (23° C.) of $1.0 \times 10^4$ to $1.0 \times 10^8$ Pa.

22. The method for peeling pressure-sensitive adhesive tape from adherents according to claim 17, wherein the pressure-sensitive adhesive tape has a 180° peel strength equal to or more than 5 N/20 mm.

23. The method for peeling pressure-sensitive adhesive tape from adherents according to claim 17,
wherein the pressure-sensitive adhesive layer contains a filler.

24. The method for peeling pressure-sensitive adhesive tape from adherents according to claim 17, wherein the base material layer comprises 50% or more of a styrene-based resin, wherein the styrene-based resin is selected from the group consisting of a styrene-isoprene-styrene copolymer, a styrene-butadiene-styrene copolymer, a styrene-ethylene-butylene copolymer, and a styrene-ethylene propylene copolymer.

25. The method for peeling pressure-sensitive adhesive tape from adherents according to claim 17, wherein the base material layer is formed from a block copolymer of a polyaromatic vinyl compound and a conjugated diene compound; and
the pressure-sensitive adhesive layer is disposed on the base material layer, the pressure-sensitive adhesive layer comprising an acryl-based pressure sensitive adhesive or a rubber-based pressure sensitive adhesive.

* * * * *